US012406553B2

(12) United States Patent
Chesworth et al.

(10) Patent No.: US 12,406,553 B2
(45) Date of Patent: Sep. 2, 2025

(54) GAMING MACHINE USING MULTIPLE TRIGGERS TO DETERMINE AN AWARD FROM A SUBSET OF DISPLAYED AWARDS

(71) Applicant: LNW Gaming, Inc., Las Vegas, NV (US)

(72) Inventors: Jack Chesworth, Newtown (AU); George Napoleon Bouvier, Henderson, NV (US); Kimberly Cohn, Las Vegas, NV (US); Daniel P. Louie, Chicago, IL (US); Kenneth Shawn Soong, Henderson, NV (US)

(73) Assignee: LNW Gaming, Inc., Las Vegas, NV (US)

( * ) Notice: Subject to any disclaimer, the term of this patent is extended or adjusted under 35 U.S.C. 154(b) by 0 days.

(21) Appl. No.: 18/468,761

(22) Filed: Sep. 18, 2023

(65) Prior Publication Data

US 2024/0005743 A1 Jan. 4, 2024

Related U.S. Application Data

(63) Continuation of application No. 17/669,119, filed on Feb. 10, 2022, now Pat. No. 11,798,371, which is a (Continued)

(51) Int. Cl.
*G07F 17/32* (2006.01)

(52) U.S. Cl.
CPC ...... *G07F 17/3267* (2013.01); *G07F 17/3209* (2013.01); *G07F 17/3213* (2013.01); *G07F 17/323* (2013.01); *G07F 17/3251* (2013.01)

(58) Field of Classification Search
CPC ............. G07F 17/3267; G07F 17/3209; G07F 17/3213; G07F 17/323; G07F 17/3251;
(Continued)

(56) References Cited

U.S. PATENT DOCUMENTS 4,198,052 A 4/1980 Gauselmann
4,732,386 A 3/1988 Rayfiel
(Continued)

FOREIGN PATENT DOCUMENTS

AU 200155957 A1 3/2002
AU 2013251288 A1 5/2014
(Continued)

OTHER PUBLICATIONS

Ancient Arcadia game brochure, Copyright 2011 IGT.
(Continued)

*Primary Examiner* — David L Lewis
*Assistant Examiner* — Matthew D Hoel

(57) ABSTRACT

A gaming system includes at least one input device adapted to receive a physical item associated with a monetary value that establishes a credit balance, an input indicative of a wager drawn on the credit balance for a wagering game, and a cashout input that initiates a payout from the credit balance. In response to a wager input, a wagering game is initiated that includes the spinning and stopping of a set of bonus reels through a plurality of bonus spins populating a bonus array with bonus symbols. The bonus reels comprise a combination of symbols reducing display processing requirements and improve mapping random numbers to displayed symbols for display during bonus spins having reduced durations. When completed, an award is determined based according to values associated with less than all of the bonus symbols displayed in a bonus outcome array.

20 Claims, 23 Drawing Sheets

Related U.S. Application Data continuation of application No. 17/404,370, filed on Aug. 17, 2021, now Pat. No. 11,710,378, which is a continuation of application No. 17/365,233, filed on Jul. 1, 2021, now Pat. No. 11,587,403, which is a continuation of application No. 16/879,051, filed on May 20, 2020, now Pat. No. 11,094,170, which is a continuation of application No. 16/800,769, filed on Feb. 25, 2020, now Pat. No. 11,017,638, which is a continuation of application No. 16/773,243, filed on Jan. 27, 2020, now Pat. No. 10,957,161, which is a continuation of application No. 15/910,265, filed on Mar. 2, 2018, now Pat. No. 10,643,431.

(60) Provisional application No. 62/472,699, filed on Mar. 17, 2017.

(58) Field of Classification Search
CPC ............ G07F 17/3258; G07F 17/3262; G07F 17/3265
See application file for complete search history.

(56) References Cited

U.S. PATENT DOCUMENTS

| | | | | |
|---|---|---|---|---|
| 4,733,075 | A | 3/1988 | Sato | |
| 5,100,137 | A | 3/1992 | Fulton | |
| 5,152,529 | A | 10/1992 | Okada | |
| 5,205,555 | A | 4/1993 | Hamano | |
| 5,342,047 | A | 8/1994 | Heidel et al. | |
| 5,356,140 | A | 10/1994 | Dabrowski et al. | |
| 5,393,061 | A | 2/1995 | Manship et al. | |
| 5,395,111 | A | 3/1995 | Inoue | |
| 5,431,408 | A | 7/1995 | Adams | |
| 5,511,781 | A | 4/1996 | Wood et al. | |
| 5,618,232 | A | 4/1997 | Martin | |
| 5,695,188 | A | 12/1997 | Ishibashi | |
| 5,704,835 | A | 1/1998 | Dietz | |
| 5,722,891 | A | 3/1998 | Inoue | |
| 5,752,881 | A | 5/1998 | Inoue | |
| 5,766,074 | A | 6/1998 | Cannon et al. | |
| 5,788,573 | A | 8/1998 | Baerlocher et al. | |
| 5,807,177 | A | 9/1998 | Takemoto et al. | |
| 5,810,665 | A | 9/1998 | Takemoto et al. | |
| 5,833,537 | A | 11/1998 | Barrie | |
| 5,848,932 | A | 12/1998 | Adams | |
| 5,855,515 | A | 1/1999 | Pease et al. | |
| 5,876,284 | A | 3/1999 | Acres et al. | |
| 5,882,259 | A | 3/1999 | Holmes et al. | |
| 5,882,261 | A | 3/1999 | Adams | |
| 5,890,962 | A | 4/1999 | Takemoto | |
| 5,911,418 | A | 6/1999 | Adams | |
| 5,947,820 | A | 9/1999 | Morro et al. | |
| 5,951,397 | A | 9/1999 | Dickinson | |
| 5,988,638 | A | 11/1999 | Rodesch et al. | |
| 6,027,115 | A | 2/2000 | Griswold et al. | |
| 6,033,307 | A | 3/2000 | Vancura | |
| 6,048,269 | A | 4/2000 | Burns et al. | |
| 6,050,895 | A | 4/2000 | Luciano et al. | |
| 6,056,642 | A | 5/2000 | Bennett | |
| 6,089,976 | A | 7/2000 | Schneider et al. | |
| 6,089,977 | A | 7/2000 | Bennett | |
| 6,102,798 | A | 8/2000 | Bennett | |
| 6,120,031 | A | 9/2000 | Adams | |
| 6,142,873 | A | 11/2000 | Weiss et al. | |
| 6,159,097 | A | 12/2000 | Gura | |
| 6,162,121 | A | 12/2000 | Morro et al. | |
| 6,168,520 | B1 | 1/2001 | Baerlocher et al. | |
| 6,186,894 | B1 | 2/2001 | Mayeroff | |
| 6,203,429 | B1 | 3/2001 | Demar et al. | |
| 6,213,875 | B1 | 4/2001 | Suzuki | |
| 6,224,482 | B1 | 5/2001 | Bennett | |
| 6,224,483 | B1 | 5/2001 | Mayeroff | |
| 6,224,484 | B1 | 5/2001 | Okuda et al. | |
| 6,227,971 | B1 | 5/2001 | Weiss | |
| 6,241,607 | B1 | 6/2001 | Payne et al. | |
| 6,251,013 | B1 | 6/2001 | Bennett | |
| 6,270,411 | B1 | 8/2001 | Gura et al. | |
| 6,270,412 | B1 | 8/2001 | Crawford et al. | |
| 6,290,600 | B1 | 9/2001 | Glasson | |
| 6,309,300 | B1 | 10/2001 | Glavich | |
| 6,319,124 | B1 | 11/2001 | Baerlocher et al. | |
| 6,375,567 | B1 | 4/2002 | Acres | |
| 6,375,570 | B1 | 4/2002 | Poole | |
| 6,413,162 | B1 | 7/2002 | Baerlocher et al. | |
| 6,481,713 | B2 | 11/2002 | Perrie et al. | |
| 6,517,432 | B1 | 2/2003 | Jaffe | |
| 6,537,150 | B1 | 3/2003 | Luciano et al. | |
| 6,544,120 | B2 | 4/2003 | Ainsworth | |
| 6,547,242 | B1 | 4/2003 | Sugiyama et al. | |
| 6,551,187 | B1 | 4/2003 | Jaffe | |
| 6,554,704 | B2 | 4/2003 | Nicastro et al. | |
| 6,558,254 | B2 | 5/2003 | Baelocher et al. | |
| 6,561,900 | B1 | 5/2003 | Baerlocher et al. | |
| 6,565,434 | B1 | 5/2003 | Acres | |
| 6,641,477 | B1 | 11/2003 | Dietz | |
| 6,652,378 | B2 | 11/2003 | Cannon et al. | |
| 6,656,040 | B1 | 12/2003 | Brosnan et al. | |
| 6,657,923 | B2 | 12/2003 | Laughlin | |
| 6,692,356 | B2 | 2/2004 | Baerlocher et al. | |
| 6,702,675 | B2 | 3/2004 | Poole et al. | |
| 6,731,313 | B1 | 5/2004 | Kaminkow | |
| 6,786,818 | B1 | 9/2004 | Rothschild et al. | |
| 6,832,957 | B2 | 12/2004 | Falconer | |
| 6,837,790 | B1 | 1/2005 | Kaminkow | |
| 6,869,360 | B2 | 3/2005 | Marks et al. | |
| 6,896,617 | B2 | 5/2005 | Daly | |
| 6,910,962 | B2 | 6/2005 | Marks et al. | |
| 6,916,243 | B2 | 7/2005 | Yoshida | |
| 6,918,834 | B2 | 7/2005 | Vancura | |
| 6,926,609 | B2 | 8/2005 | Martin | |
| 6,960,134 | B2 | 11/2005 | Hartl et al. | |
| 7,018,293 | B2 | 3/2006 | Brown et al. | |
| 7,029,395 | B1 | 4/2006 | Baerlocher | |
| 7,121,945 | B2 | 10/2006 | Suganuma et al. | |
| 7,156,740 | B2 | 1/2007 | Kaminkow | |
| 7,179,169 | B2 | 2/2007 | Beaulieu et al. | |
| 7,252,591 | B2 | 8/2007 | Van Asdale | |
| 7,316,613 | B2 | 1/2008 | Luccesi et al. | |
| 7,371,170 | B2 | 5/2008 | Cregan et al. | |
| 7,377,850 | B2 | 5/2008 | Shackelford et al. | |
| 7,452,276 | B2 | 11/2008 | Loose et al. | |
| 7,458,890 | B2 | 12/2008 | Loose et al. | |
| 7,488,252 | B2 | 2/2009 | Griswold et al. | |
| 7,503,847 | B2 | 3/2009 | Baerlocher | |
| 7,526,736 | B2 | 4/2009 | Kaminkow et al. | |
| 7,553,231 | B2 | 6/2009 | Rodgers et al. | |
| 7,578,735 | B2 | 8/2009 | Frizzell et al. | |
| 7,601,062 | B2 | 10/2009 | Cole et al. | |
| 7,604,538 | B2 | 10/2009 | Pacey | |
| 7,625,278 | B2 | 12/2009 | Paulsen et al. | |
| 7,654,895 | B2 | 2/2010 | Pacey | |
| 7,654,899 | B2 | 2/2010 | Durham et al. | |
| 7,699,699 | B2 | 4/2010 | Gilliland et al. | |
| 7,744,460 | B2 | 6/2010 | Walker et al. | |
| 7,785,191 | B2 | 8/2010 | Marks et al. | |
| 7,841,934 | B2 | 11/2010 | Gauselmann | |
| 7,980,936 | B2 | 7/2011 | Mead | |
| 8,021,225 | B2 | 9/2011 | Okada | |
| 8,066,563 | B1 | 11/2011 | Schultz et al. | |
| 8,083,581 | B2 | 12/2011 | Marks et al. | |
| 8,105,151 | B2 | 1/2012 | Caputo et al. | |
| 8,147,322 | B2 | 4/2012 | Walker et al. | |
| 8,162,740 | B2 | 4/2012 | Aoki | |
| 8,192,275 | B2 | 6/2012 | Aoki et al. | |
| 8,246,442 | B1 | 8/2012 | Barrie | |
| 8,282,474 | B2 * | 10/2012 | Caspers | G07F 17/32 463/16 |
| 8,287,357 | B2 | 10/2012 | Evans | |
| 8,323,091 | B2 | 12/2012 | Frank et al. | |
| 8,357,041 | B1 | 1/2013 | Saunders | |
| 8,360,851 | B2 | 1/2013 | Aoki et al. | |
| 8,366,538 | B1 | 2/2013 | Saunders et al. | |

(56) References Cited

U.S. PATENT DOCUMENTS 8,371,930 B1 2/2013 Saunders et al.
8,388,432 B2 3/2013 Mattice et al.
8,414,380 B2 4/2013 Saunders et al.
8,465,358 B2 6/2013 Kemper
8,496,522 B2 7/2013 Caputo et al.
8,512,121 B2 8/2013 Macvittie et al.
8,512,124 B2 8/2013 Bramble et al.
8,512,138 B2 8/2013 Saunders
8,523,659 B2 9/2013 Evans
8,574,059 B2 11/2013 Rodgers et al.
8,602,868 B2 12/2013 Johnson et al.
8,608,545 B2 12/2013 Arora et al.
8,662,986 B2 3/2014 Rodgers et al.
8,690,660 B2 4/2014 Saunders et al.
8,696,434 B2 4/2014 Tsukahara
8,702,487 B2 4/2014 Thomas
8,790,169 B2 7/2014 Saunders
8,795,059 B2 8/2014 Aoki et al.
8,814,667 B2 * 8/2014 Caspers .................. G07F 17/32 463/16
8,821,254 B2 9/2014 Tsukahara
8,851,974 B2 10/2014 Caputo et al.
8,870,642 B2 10/2014 Leupp et al.
8,882,578 B2 11/2014 Saunders
8,961,291 B2 2/2015 Dias Pires et al.
9,005,022 B2 4/2015 Saunders
9,011,233 B2 4/2015 Ryan
9,098,847 B2 8/2015 Basallo et al.
9,098,973 B2 8/2015 Basallo et al.
9,123,211 B2 * 9/2015 Jaffe .................. G07F 17/3258
9,165,433 B2 10/2015 Caputo
9,177,447 B2 11/2015 Zoltewicz et al.
9,202,345 B2 12/2015 Zoltewicz et al.
9,230,410 B2 1/2016 Saunders et al.
9,245,421 B2 1/2016 Saunders et al.
9,251,667 B2 2/2016 Marks et al.
9,257,017 B2 2/2016 Saunders et al.
9,262,895 B2 2/2016 Rodgers et al.
9,275,524 B2 3/2016 Nicely
9,280,879 B2 * 3/2016 Caspers .................. G07F 17/34
9,299,224 B2 3/2016 Leupp
9,311,781 B2 4/2016 Edwards
9,349,251 B2 5/2016 Caputo et al.
9,355,528 B2 5/2016 Nicely
9,361,766 B2 * 6/2016 Englman ................. G07F 17/32
9,430,900 B2 8/2016 Zoltewicz et al.
9,466,169 B2 10/2016 Basallo et al.
9,474,972 B2 10/2016 Lenger
9,495,839 B2 11/2016 Aoki et al.
9,564,013 B2 * 2/2017 Jaffe .................. G07F 17/3213
9,595,157 B2 3/2017 Rasmussen et al.
9,607,473 B2 * 3/2017 Arezina .................. G07F 17/32
9,633,506 B2 4/2017 Basallo et al.
9,940,775 B2 * 4/2018 Eaton .................. G07F 17/3267
10,013,855 B2 7/2018 Nakamura
10,037,651 B2 * 7/2018 You ..................... G07F 17/3267
10,043,350 B2 8/2018 Gomez et al.
10,204,473 B2 2/2019 Lenger
10,242,533 B2 3/2019 Okada et al.
10,366,571 B1 7/2019 Wurmbrand et al.
10,366,575 B2 7/2019 Visser
10,388,112 B2 * 8/2019 You ......................... G07F 17/34
10,417,877 B2 9/2019 Gomez et al.
10,475,294 B2 11/2019 Gomez et al.
10,497,203 B2 12/2019 Elmqvist
10,593,147 B2 * 3/2020 Cong ...................... G07F 17/34
10,643,431 B2 * 5/2020 Chesworth ............ G07F 17/323
10,672,220 B2 6/2020 Lenger
10,706,664 B2 7/2020 Boese et al.
10,726,676 B2 * 7/2020 You ..................... G07F 17/3225
10,733,850 B2 * 8/2020 Davis ...................... G07F 17/34
10,769,888 B2 * 9/2020 You ......................... G07F 17/34
10,839,648 B2 11/2020 Okada et al.
10,957,159 B2 * 3/2021 Marsh ................. G07F 17/3246
10,957,161 B2 * 3/2021 Chesworth ............ G07F 17/323
11,017,638 B2 * 5/2021 Chesworth .......... G07F 17/3213
11,024,133 B2 * 6/2021 Davis .................. G07F 17/3267
11,094,170 B2 * 8/2021 Chesworth .......... G07F 17/3251
11,176,777 B2 * 11/2021 Pariseau ............. G07F 17/3258
11,257,327 B1 * 2/2022 Sanborn .............. G07F 17/3213
11,276,277 B2 * 3/2022 Delekta ............... G07F 17/3258
11,315,384 B2 * 4/2022 Uberuaga ........... G07F 17/3213
11,354,982 B2 * 6/2022 Kearns ................ G07F 17/3213
11,367,327 B2 * 6/2022 You ..................... G07F 17/3213
11,393,294 B2 * 7/2022 Marks ................. G07F 17/3267
11,475,735 B2 * 10/2022 Visser ................. G07F 17/3213
11,557,177 B2 * 1/2023 Milosevich ......... G07F 17/3267
11,587,403 B2 * 2/2023 Chesworth .......... G07F 17/3209
2001/0021666 A1 9/2001 Yoshida et al.
2002/0016200 A1 2/2002 Baerlocher et al.
2002/0045474 A1 4/2002 Singer et al.
2002/0155881 A1 10/2002 Yoshida
2002/0183105 A1 12/2002 Cannon et al.
2003/0017865 A1 1/2003 Beaulieu et al.
2003/0027619 A1 2/2003 Nicastro, Sr.
2003/0035346 A1 2/2003 Laughlin
2003/0064782 A1 4/2003 Beaulieu et al.
2003/0064801 A1 4/2003 Breckner et al.
2003/0064802 A1 4/2003 Rodgers et al.
2003/0069063 A1 4/2003 Bilyeu et al.
2003/0130034 A1 7/2003 Suganuma et al.
2003/0157980 A1 8/2003 Loose et al.
2004/0012145 A1 1/2004 Inoue
2004/0023714 A1 2/2004 Asdale
2004/0043815 A1 3/2004 Kaminkow
2004/0048646 A1 3/2004 Visocnik
2004/0092315 A1 5/2004 Boyd et al.
2004/0171417 A1 9/2004 Beaulieu et al.
2004/0198489 A1 10/2004 Kaminkow et al.
2005/0054442 A1 3/2005 Anderson et al.
2005/0130731 A1 6/2005 Englman et al.
2005/0159208 A1 7/2005 Pacey
2006/0009286 A1 1/2006 Durham et al.
2006/0063588 A1 3/2006 Poole
2006/0111173 A1 5/2006 Yang
2006/0142080 A1 6/2006 Enzminger
2006/0205469 A1 9/2006 Schultz et al.
2006/0247002 A1 11/2006 Yoshimi et al.
2007/0060248 A1 3/2007 Rodgers et al.
2007/0060255 A1 3/2007 Baerlocher et al.
2007/0060275 A1 3/2007 Gilmore et al.
2007/0129135 A1 6/2007 Marks et al.
2007/0149267 A1 6/2007 Ross et al.
2007/0281784 A1 12/2007 Seelig et al.
2007/0287529 A1 12/2007 Kojima
2008/0108408 A1 5/2008 Wolf
2008/0108411 A1 5/2008 Jensen et al.
2008/0108422 A1 5/2008 Hedrick et al.
2008/0132321 A1 6/2008 Pau
2008/0182647 A1 7/2008 Brunet De Courssou et al.
2008/0274789 A1 11/2008 Singer et al.
2009/0036208 A1 2/2009 Pennington et al.
2009/0156287 A1 6/2009 Baumgartner
2009/0181755 A1 7/2009 Gagner et al.
2009/0291741 A1 11/2009 Schofield
2010/0075737 A1 3/2010 Bluemel
2010/0113133 A1 5/2010 Leupp
2010/0203948 A1 8/2010 Falciglia, Sr.
2010/0210343 A1 8/2010 Englman et al.
2011/0098101 A1 * 4/2011 Gomez ................... G07F 17/34 463/43
2011/0098102 A1 * 4/2011 Gomez ............... G07F 17/3258 463/20
2011/0136561 A1 6/2011 Acres
2011/0244943 A1 10/2011 Milford et al.
2011/0300937 A1 12/2011 Crowder, Jr. et al.
2012/0015707 A1 1/2012 Hornik et al.
2012/0077564 A1 3/2012 Collette et al.
2012/0094738 A1 4/2012 Aoki et al.
2012/0178517 A1 7/2012 Montenegro et al.
2012/0220360 A1 8/2012 Kelly et al.
2012/0329552 A1 * 12/2012 Caspers .................. G07F 17/34 463/27
2013/0065663 A1 3/2013 Johnson et al.

(56) References Cited

U.S. PATENT DOCUMENTS

2013/0079088 A1 3/2013 Lafky et al.
2013/0102375 A1 4/2013 Aoki et al.
2013/0116033 A1* 5/2013 Nicely ................ G07F 17/3213 463/17
2013/0260861 A1 10/2013 Vann et al.
2014/0024429 A1 1/2014 Aoki et al.
2014/0024433 A1* 1/2014 Gomez ................. G07F 17/329 463/20
2014/0051496 A1 2/2014 Meyer
2014/0087830 A1 3/2014 Gobe et al.
2014/0323198 A1 10/2014 Tuck
2014/0329578 A1* 11/2014 Caspers .............. G07F 17/3244 463/20
2015/0031437 A1 1/2015 Gomez et al.
2015/0206386 A1 7/2015 Jaffe et al.
2015/0332559 A1* 11/2015 Jaffe ................... G07F 17/3213 463/20
2015/0379831 A1 12/2015 Lee et al.
2016/0042597 A1 2/2016 Olive
2016/0055719 A9* 2/2016 Englman ............. G07F 17/3262 463/25
2016/0093143 A1 3/2016 Lamb et al.
2016/0133088 A1 5/2016 Givant
2016/0155303 A1 6/2016 Aoki et al.
2016/0225233 A1* 8/2016 Arezina ................ G07F 17/323
2016/0358412 A1* 12/2016 Eaton .................. G07F 17/3267
2016/0364943 A1 12/2016 Kroon
2016/0371933 A1* 12/2016 Nicely .................... G07F 17/32
2017/0092038 A1 3/2017 Vann et al.
2017/0092071 A1 3/2017 Cuddy et al.
2017/0323520 A1 11/2017 Moskowitz
2017/0372558 A1 12/2017 You et al.
2018/0102020 A1* 4/2018 You ..................... G07F 17/3267
2018/0268659 A1* 9/2018 Chesworth .......... G07F 17/3267
2019/0206191 A1 7/2019 Halvorson
2019/0236905 A1 8/2019 Washington et al.
2019/0318579 A1* 10/2019 Marsh ................. G07F 17/3267
2019/0340880 A1* 11/2019 You ..................... G07F 17/3225
2020/0051371 A1 2/2020 Nelson et al.
2020/0066088 A1 2/2020 Nelson
2020/0090452 A1 3/2020 Higgins et al.
2020/0111282 A1 4/2020 Oberberger et al.
2020/0111316 A1 4/2020 Dicarlo
2020/0126367 A1 4/2020 Bosak
2020/0160664 A1* 5/2020 Chesworth .......... G07F 17/3267
2020/0193778 A1* 6/2020 Chesworth .......... G07F 17/3213
2020/0211321 A1 7/2020 Kitagawa
2020/0250917 A1 8/2020 Liss
2020/0279451 A1 9/2020 La Guardia et al.
2020/0279452 A1 9/2020 La Guardia et al.
2020/0279457 A1* 9/2020 Chesworth .......... G07F 17/3251
2020/0394876 A1 12/2020 Meckenzie et al.
2021/0082239 A1 3/2021 Thomas et al.
2021/0082248 A1* 3/2021 Guerrero ............. G07F 17/3213
2021/0082254 A1 3/2021 Givant
2021/0158661 A1 5/2021 Fulton et al.
2021/0192886 A1 6/2021 Keilwert et al.
2021/0256812 A1* 8/2021 Kearns ................ G07F 17/3213
2021/0327219 A1* 10/2021 Chesworth .......... G07F 17/3267
2021/0343104 A1 11/2021 Stankevich
2021/0366227 A1* 11/2021 Milosevich ............. G07F 17/34
2021/0375098 A1* 12/2021 Chesworth .......... G07F 17/3267
2022/0122408 A1 4/2022 Huke et al.
2022/0165132 A1* 5/2022 Chesworth .......... G07F 17/3209
2022/0189255 A1* 6/2022 Kearns ................ G07F 17/3213
2022/0262207 A1* 8/2022 Kearns ................ G07F 17/3253
2023/0015622 A1 1/2023 Givant
2023/0068526 A1 3/2023 Jones et al.
2023/0096360 A1 3/2023 Atkinson et al.

FOREIGN PATENT DOCUMENTS

AU 2014202042 A1 5/2014
AU 2015210489 A1 2/2016
GB 2097160 B 10/1982
GB 2144568 A 3/1985
GB 2144568 B 9/1985
GB 2251112 A 6/1992

OTHER PUBLICATIONS

Flying Carpet game brochure, Copyright 2008 Bally.
Golden Knight game brochure, Copyright 2010 IGT.
Sultan of Mars game brochure, Copyright 2011 IGT.
The Amulet and the Charm game brochure, Copyright 2011 IGT.

* cited by examiner

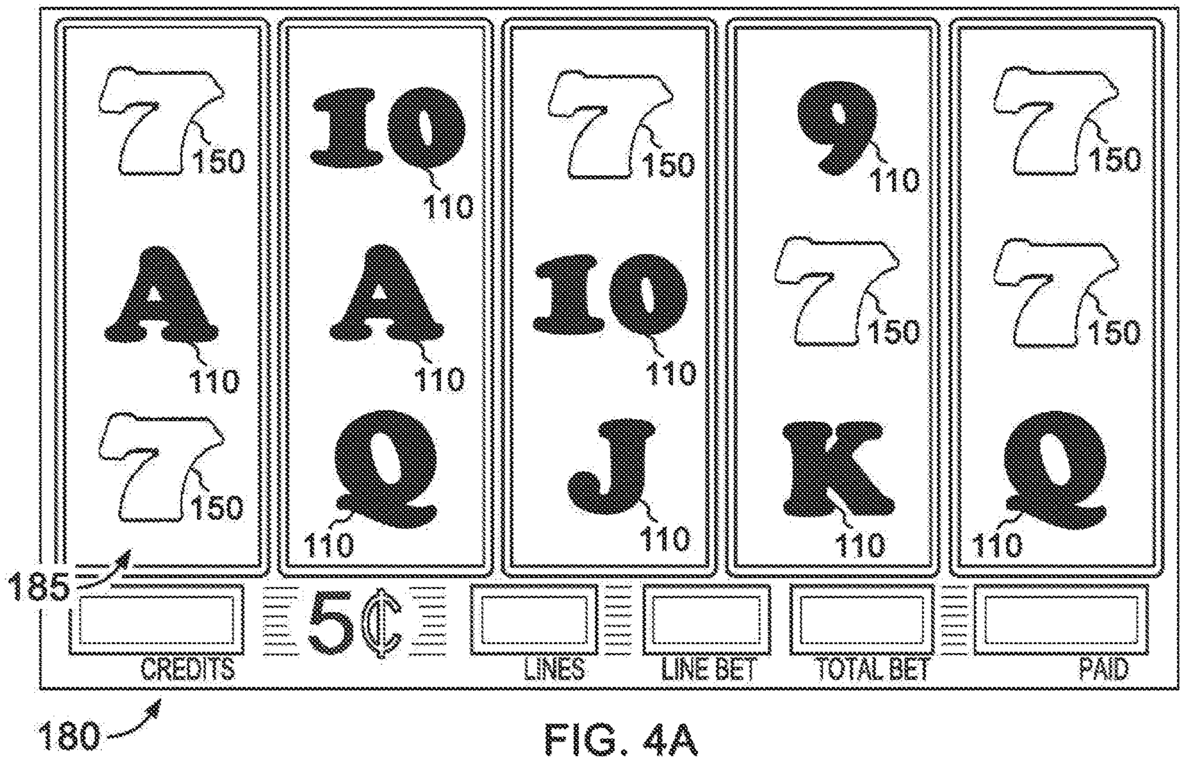
FIG. 4A
FIG. 4B
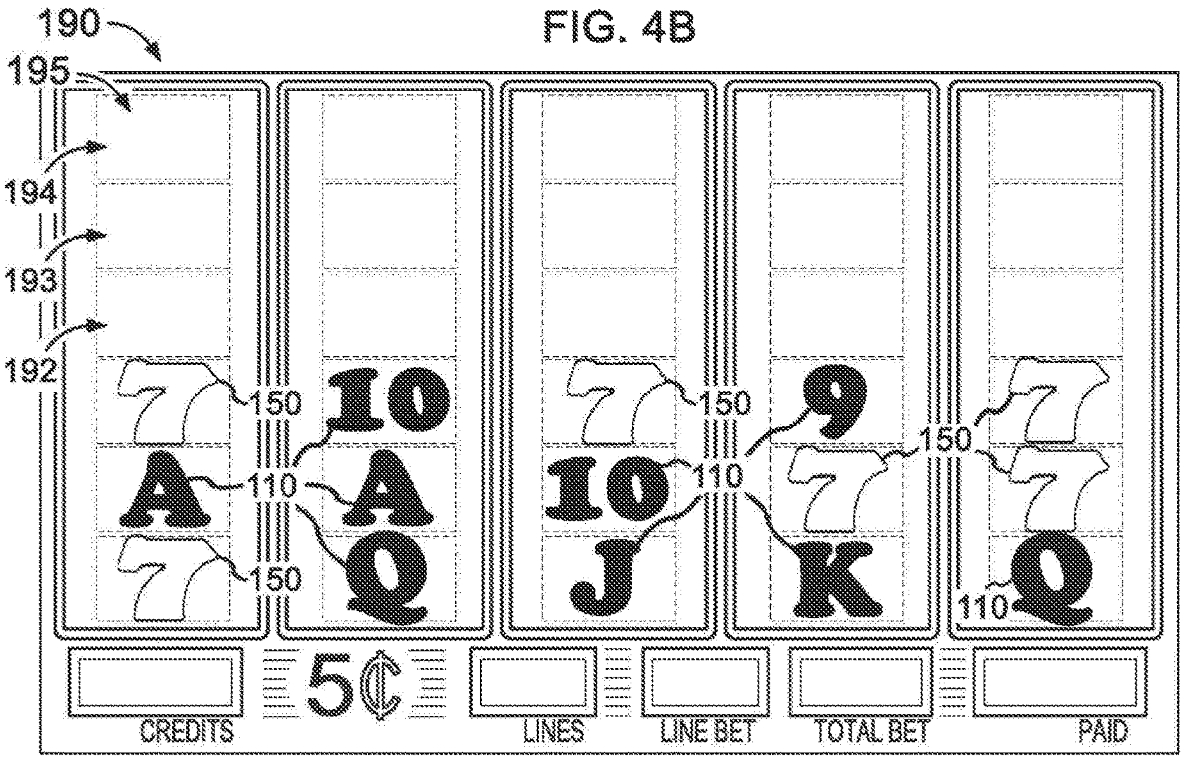

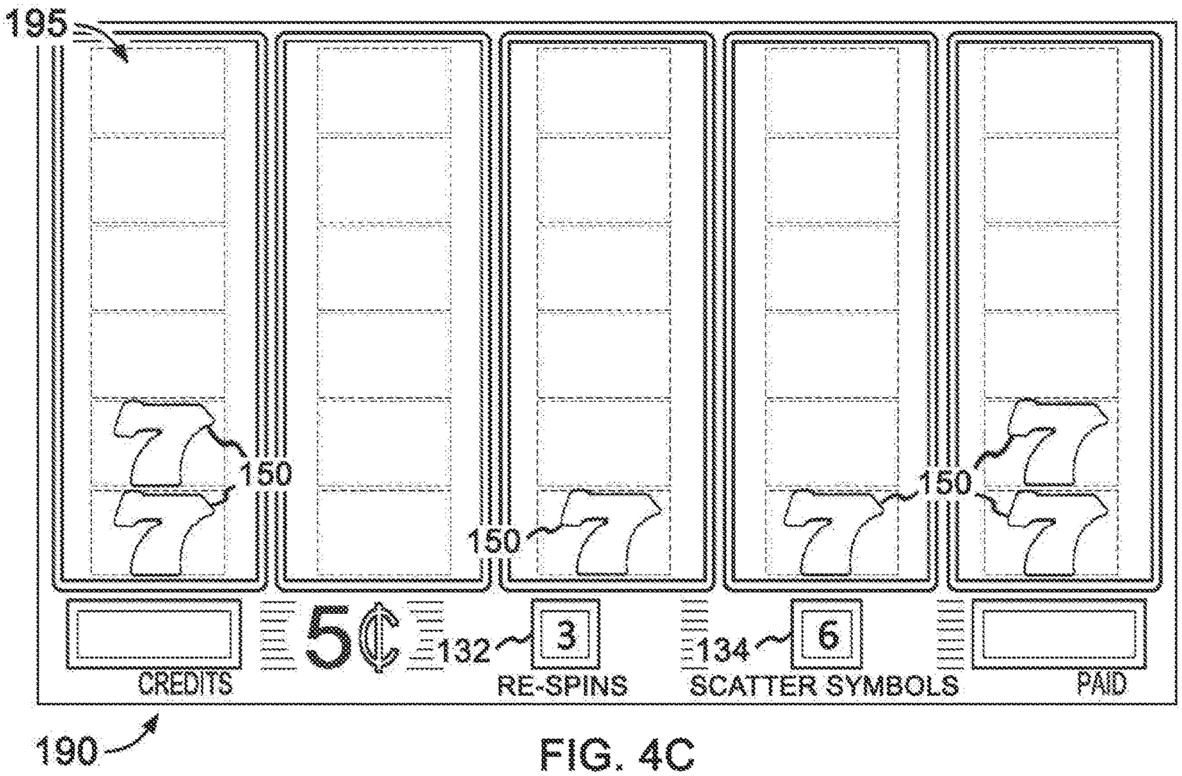
FIG. 4C
FIG. 4D
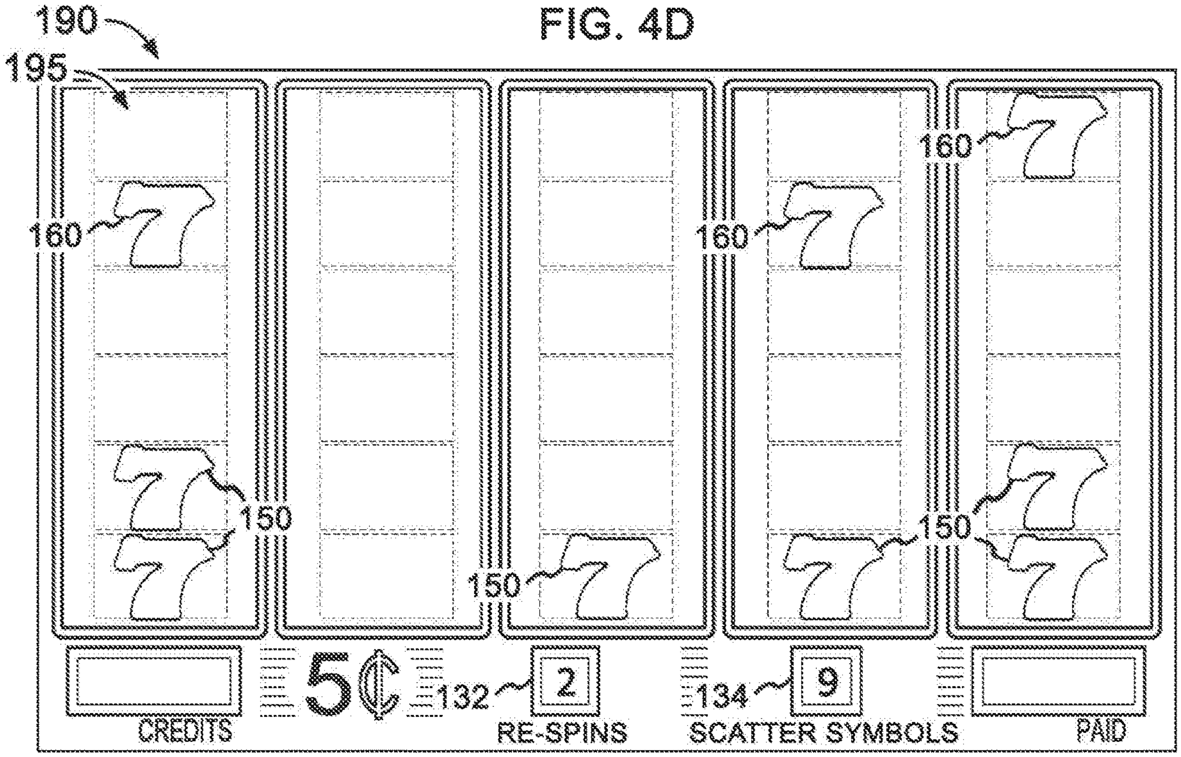

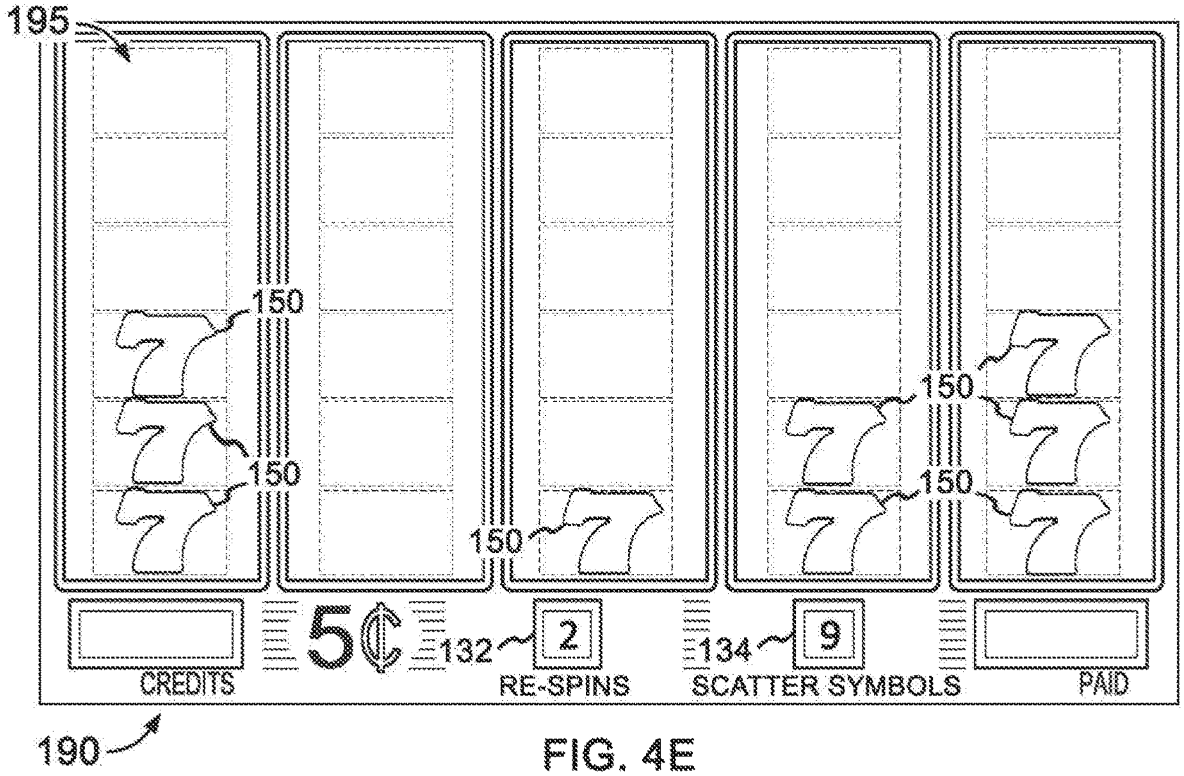
FIG. 4E
FIG. 4F
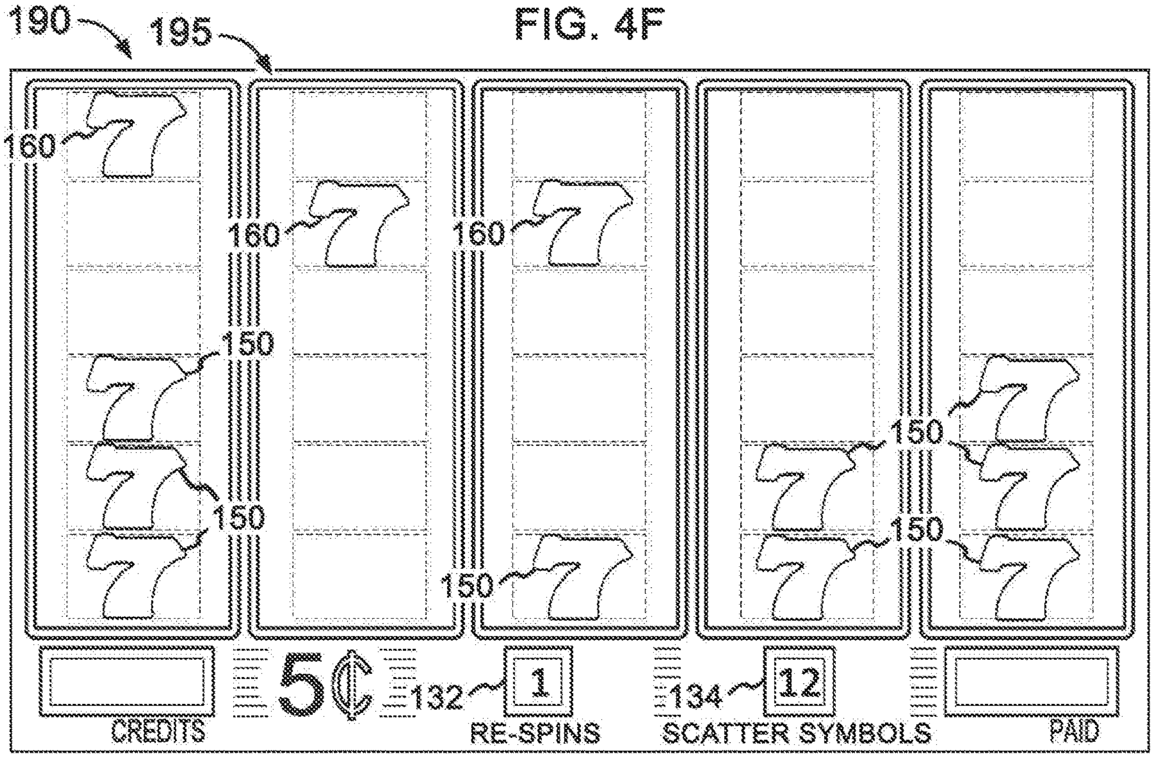

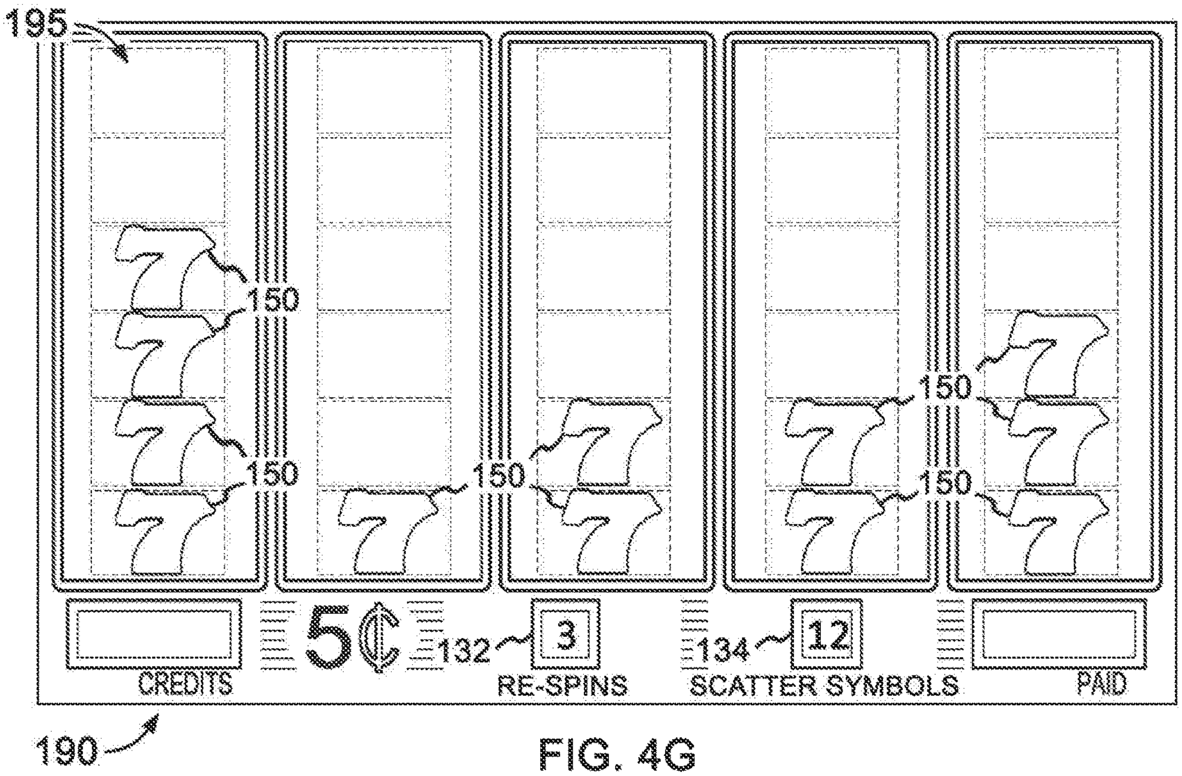
FIG. 4G
FIG. 4H
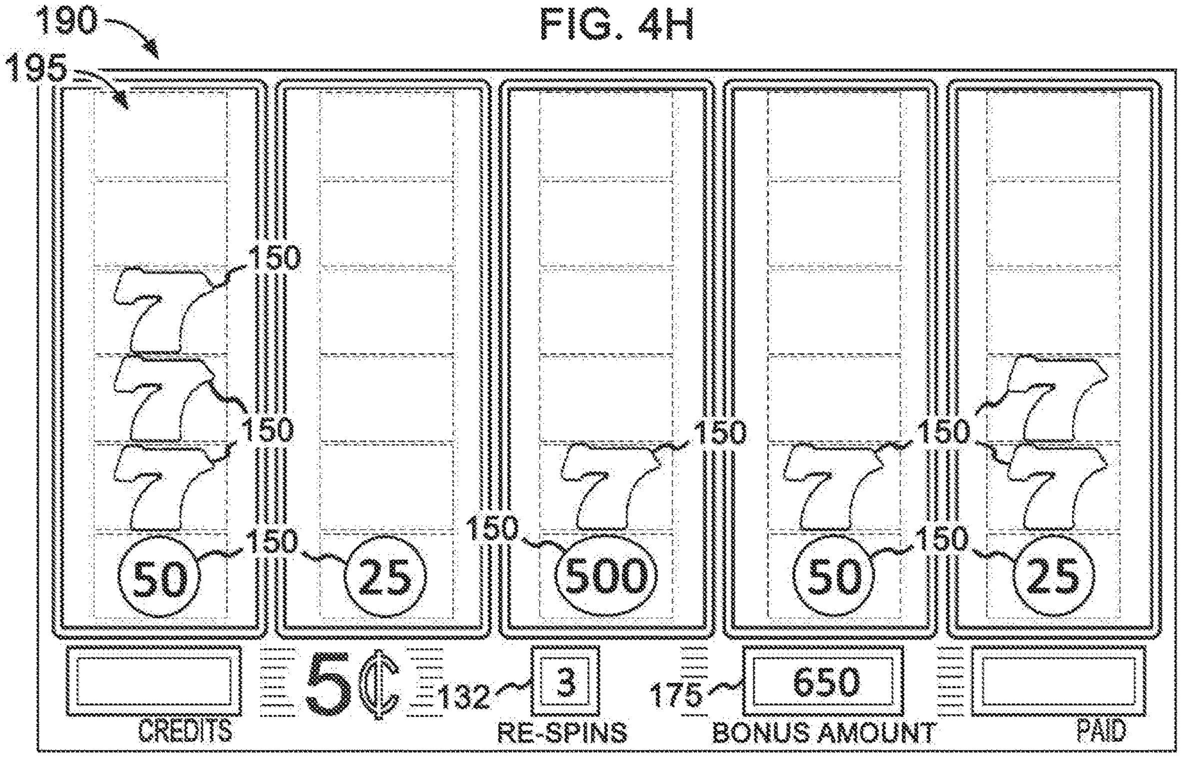

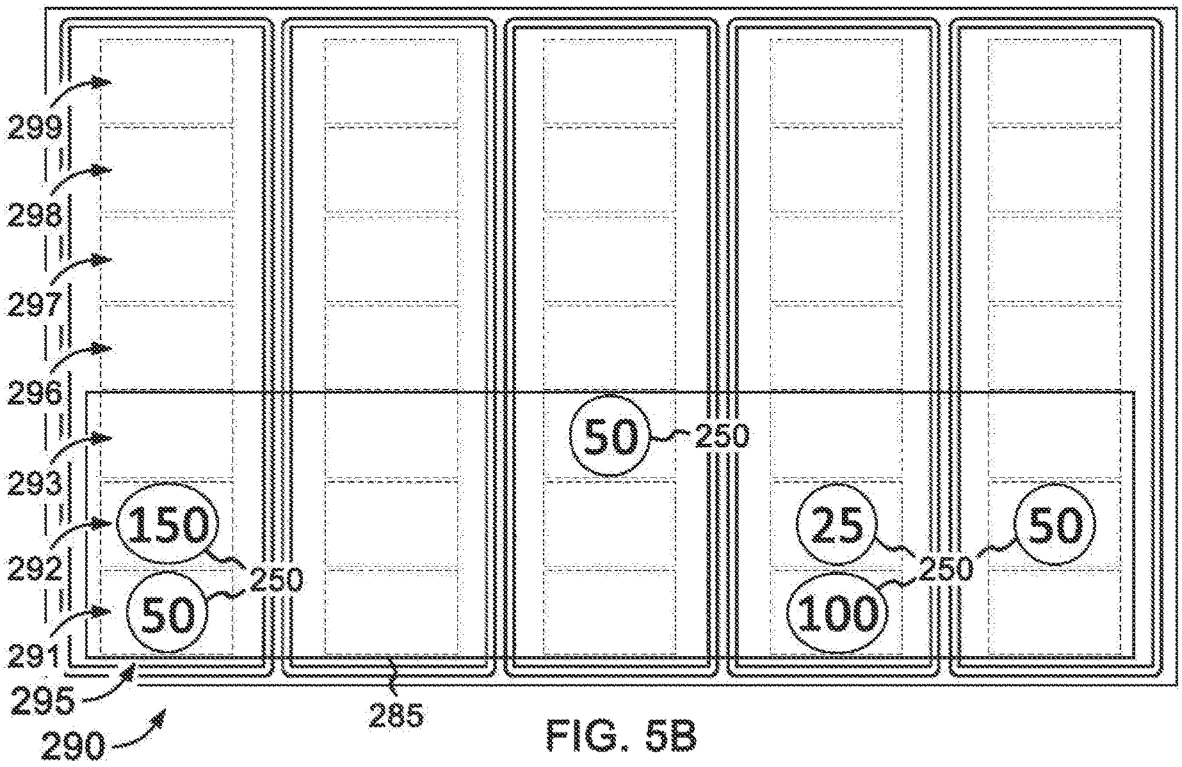
FIG. 5B
FIG. 5C
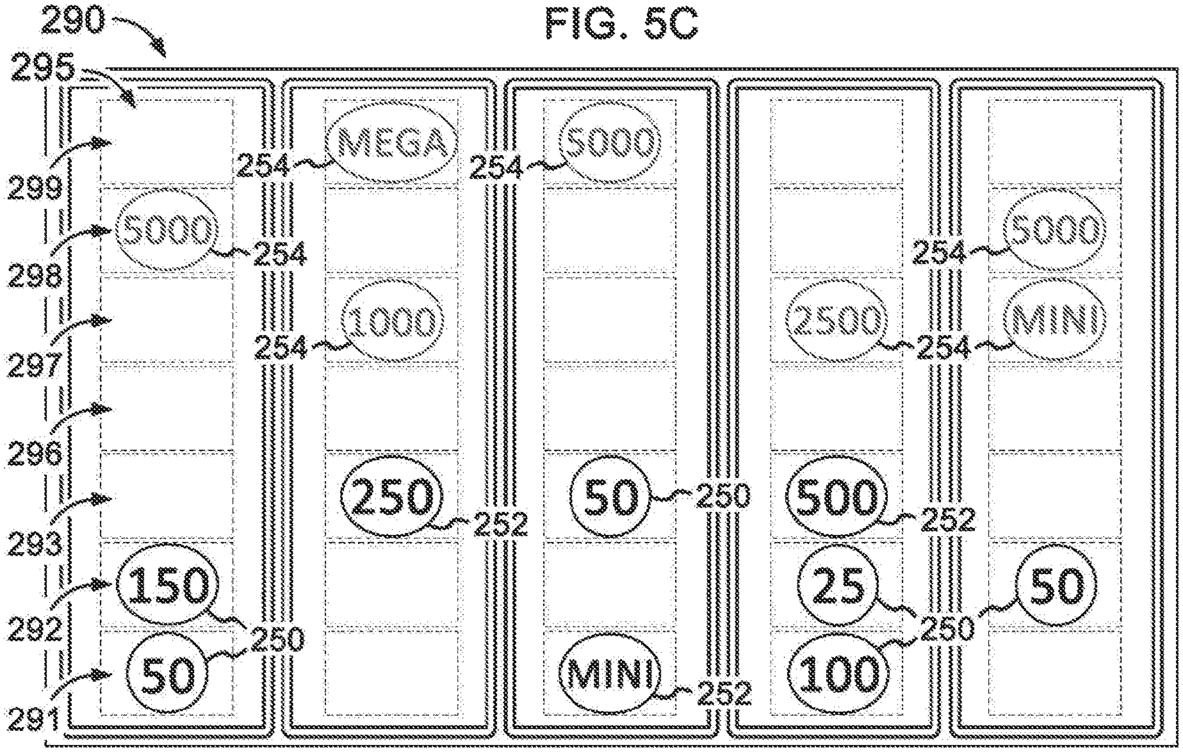

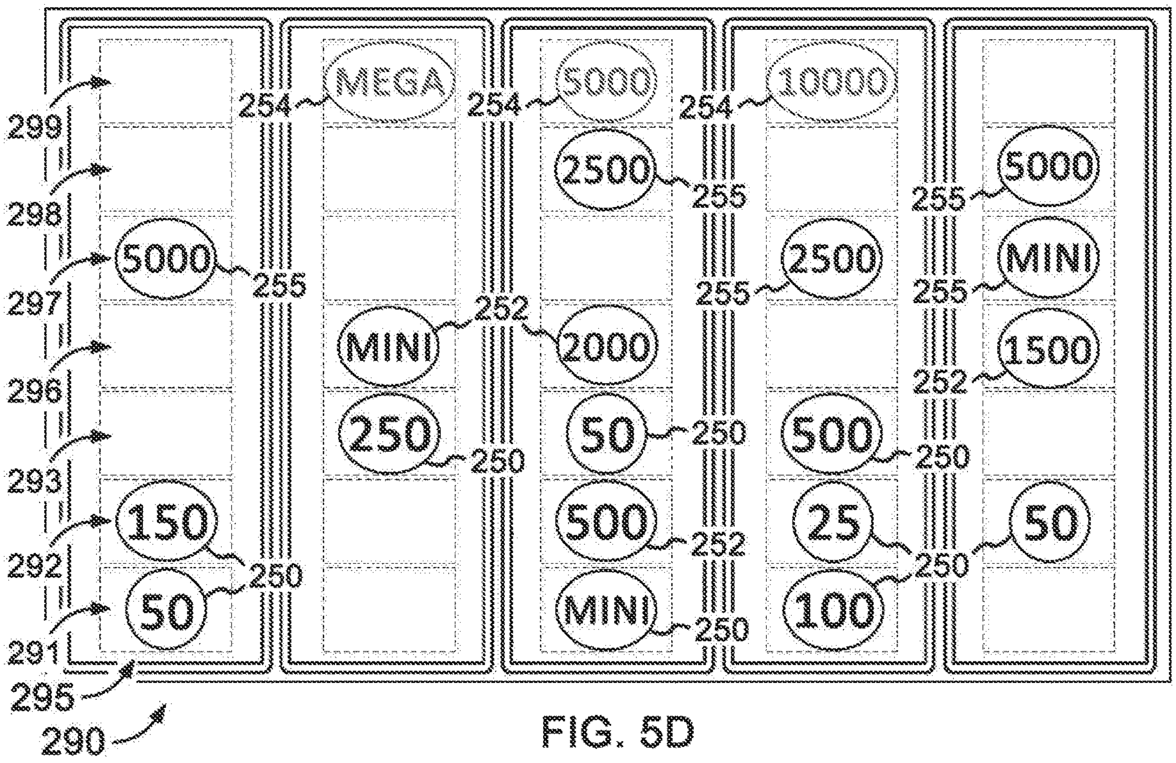
FIG. 5D
FIG. 5E
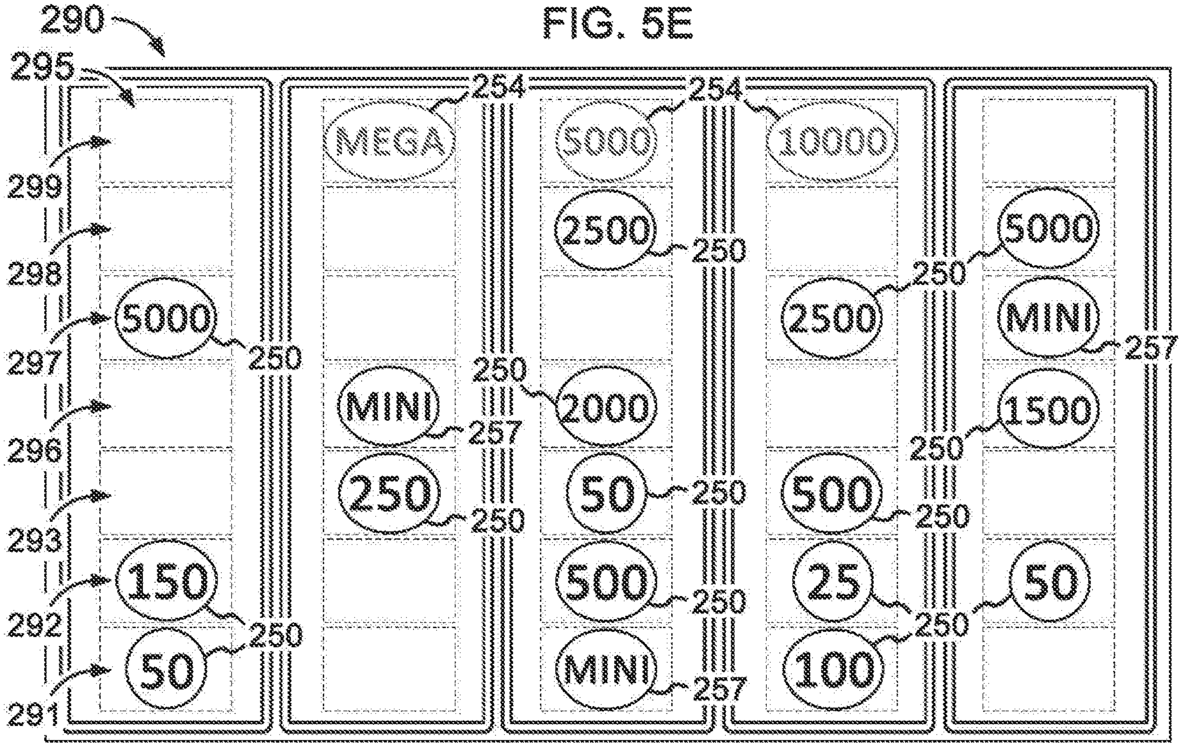

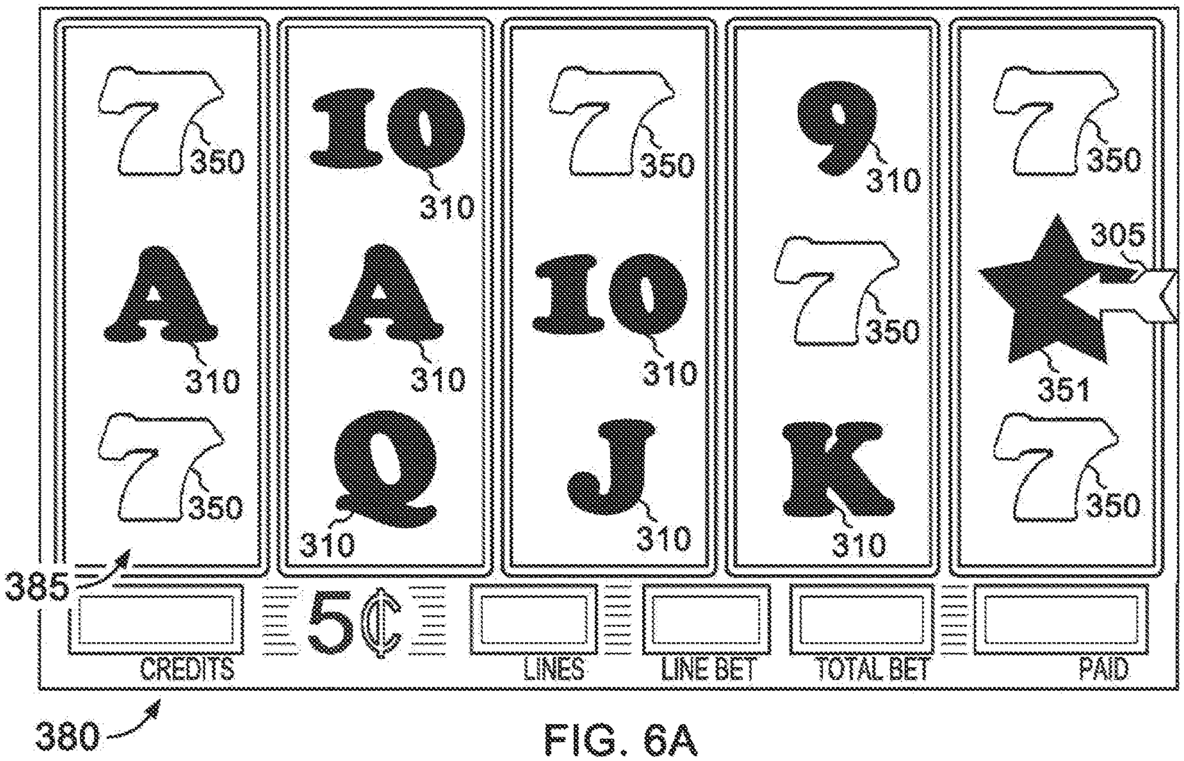
FIG. 6A
FIG. 6B
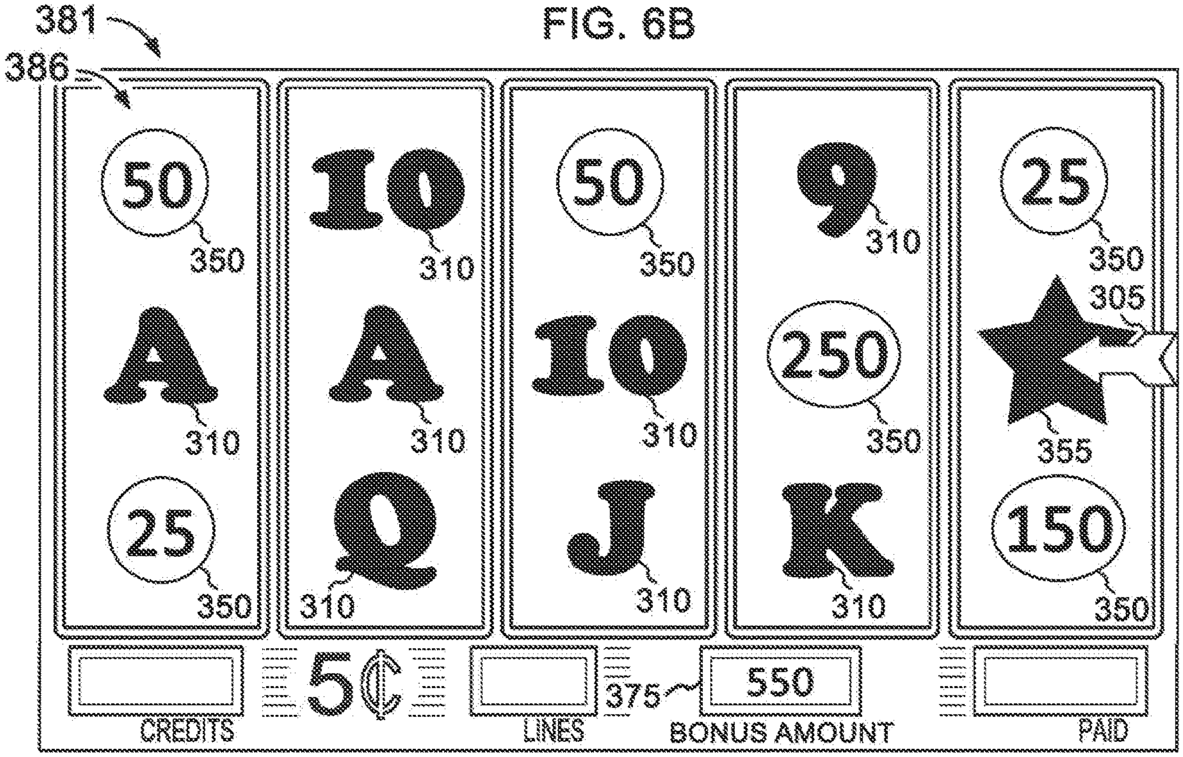

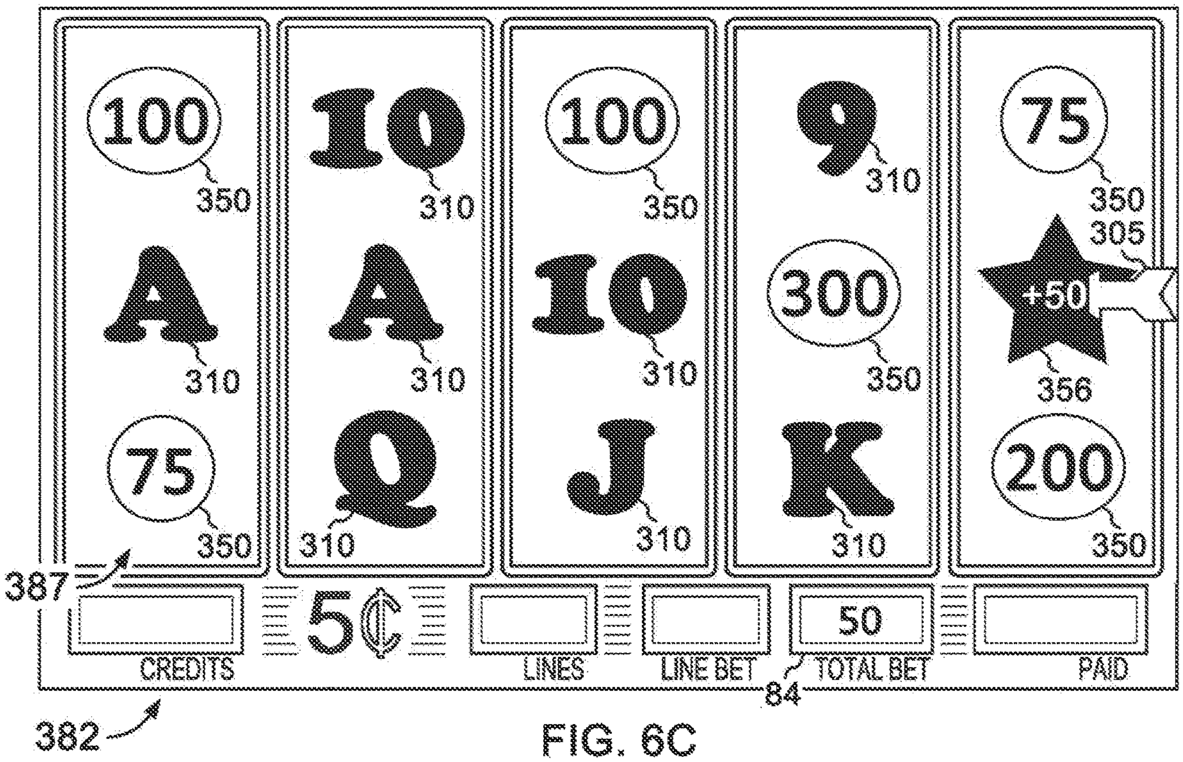
FIG. 6C
FIG. 6D
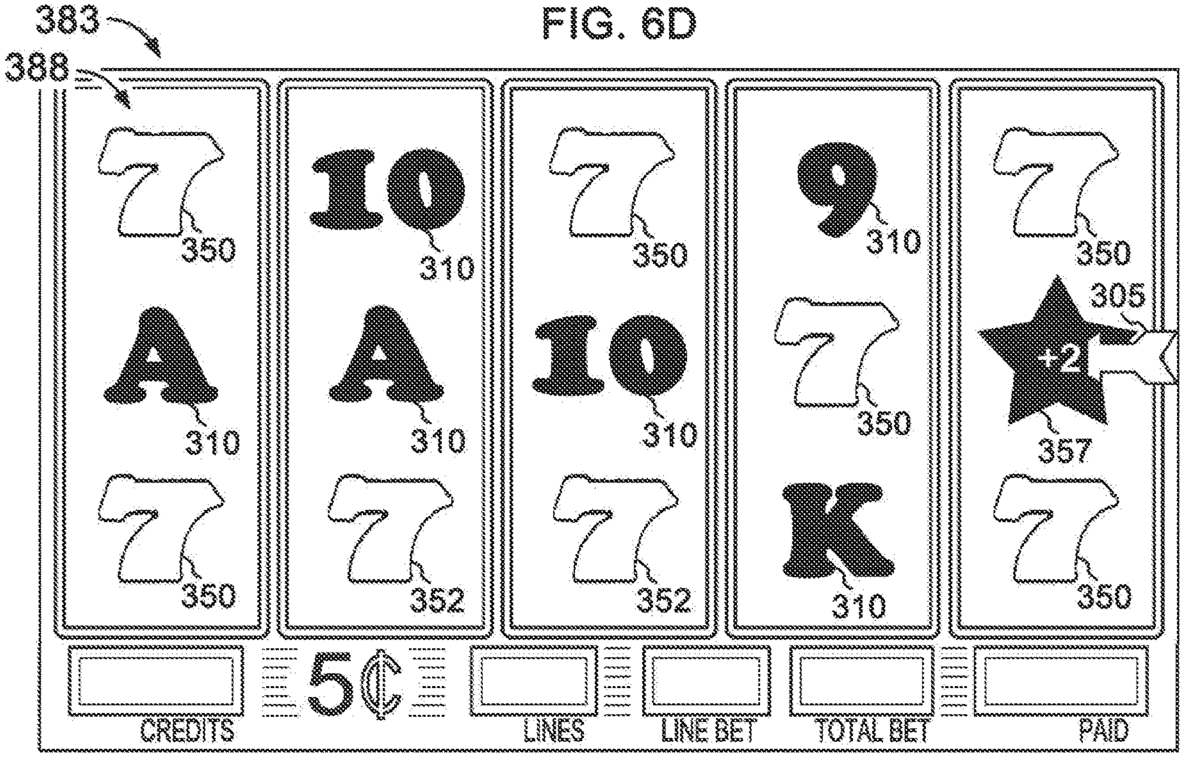

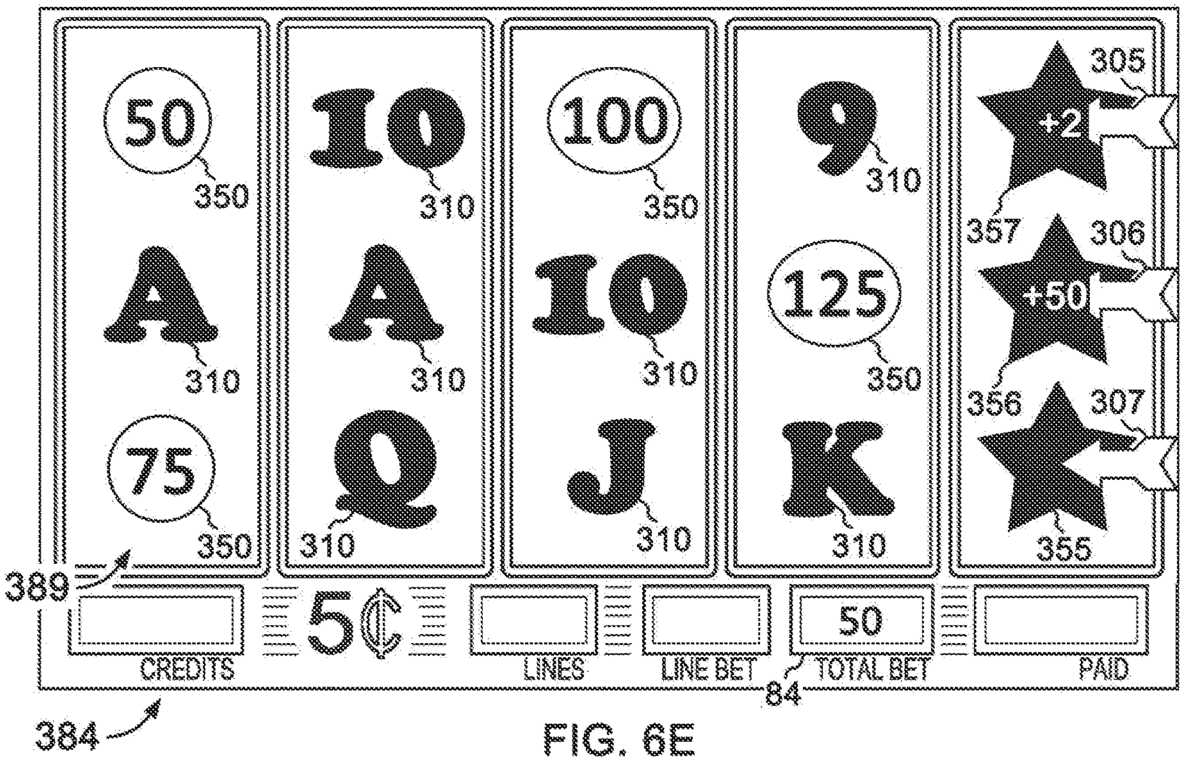
FIG. 6E
FIG. 6F
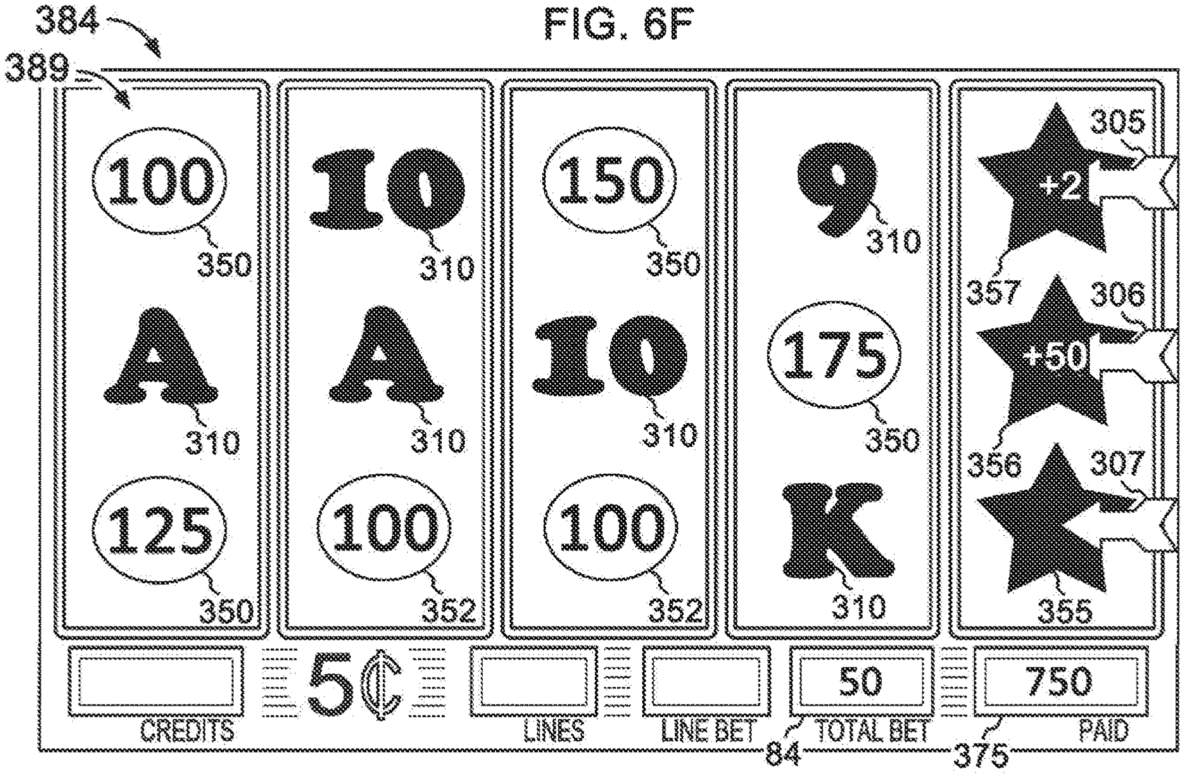

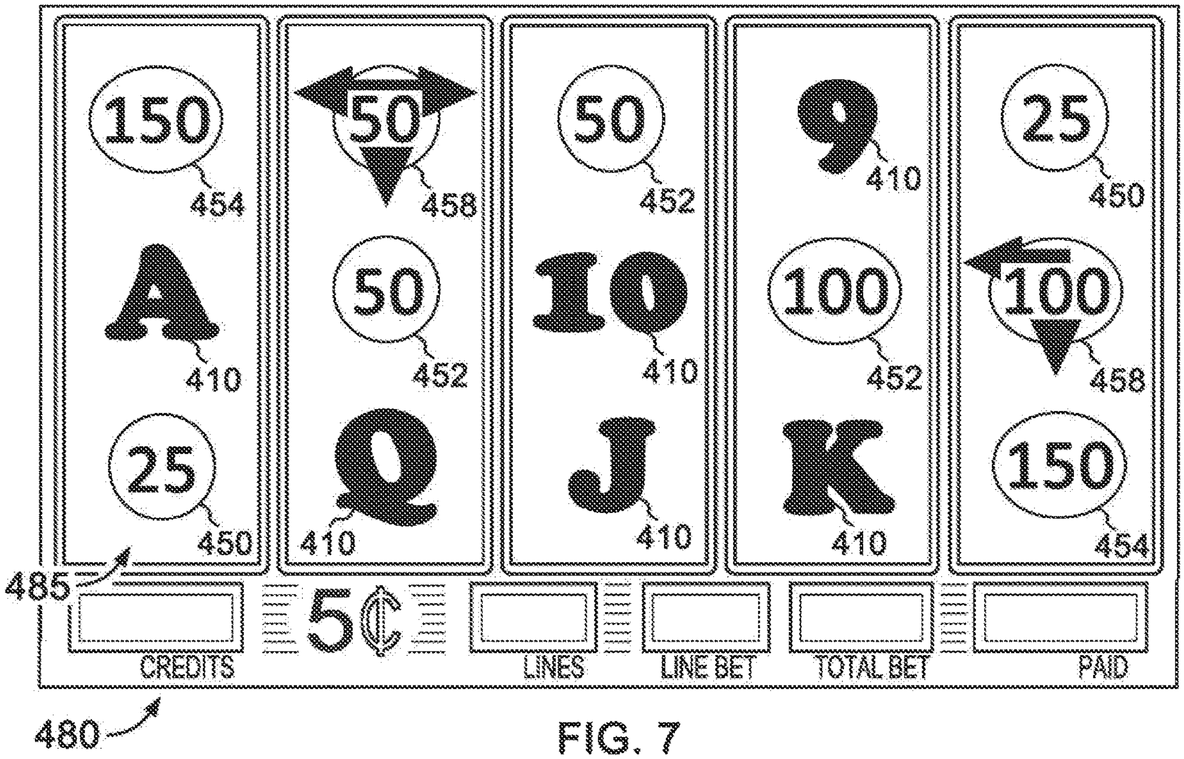
FIG. 7
FIG. 8
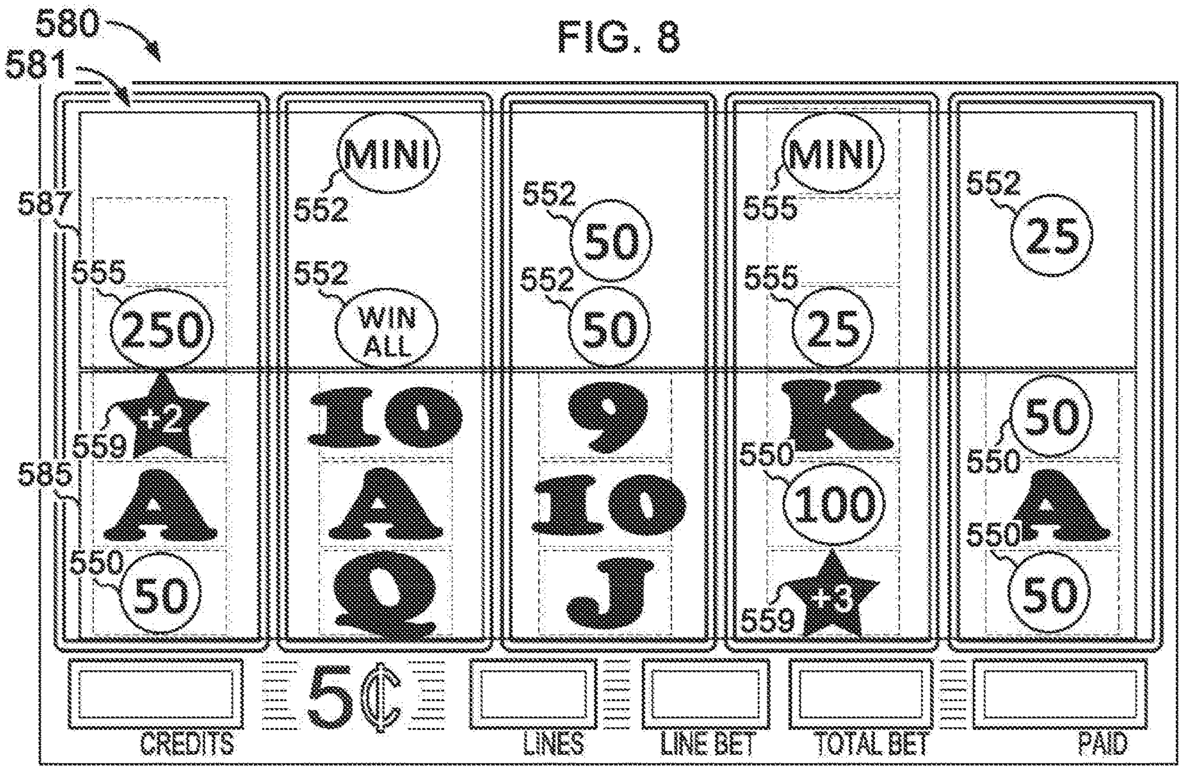

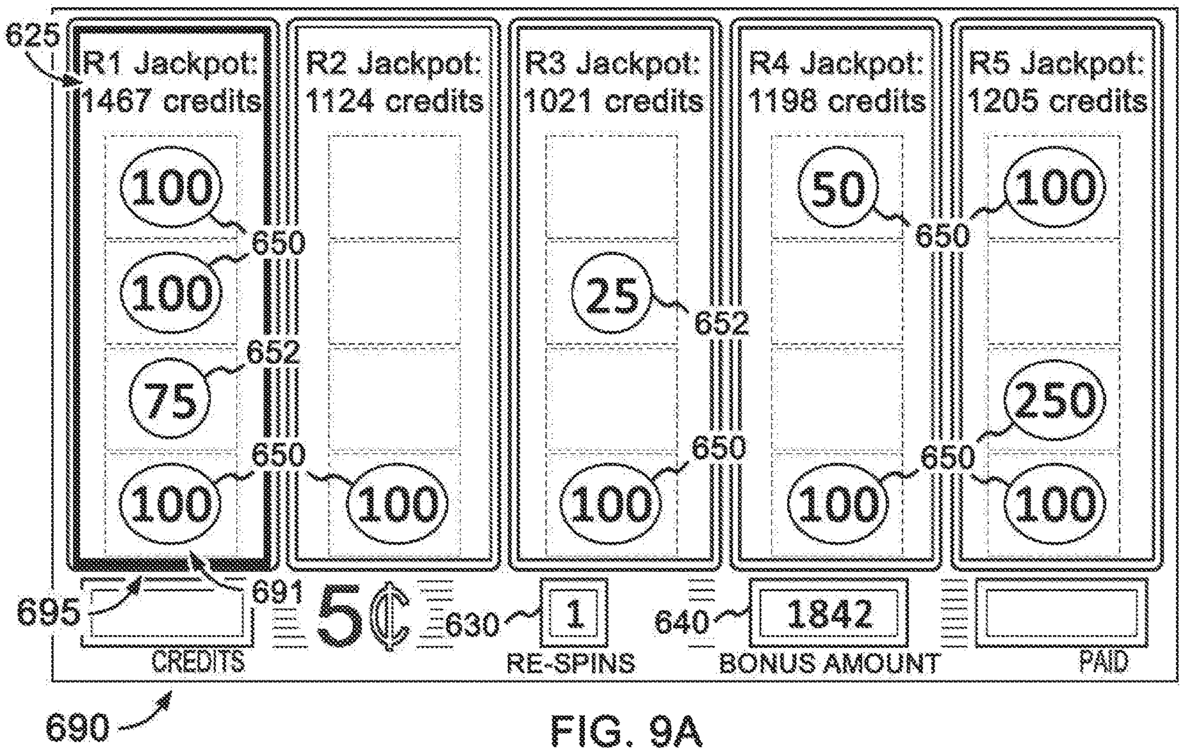
FIG. 9A
FIG. 9B
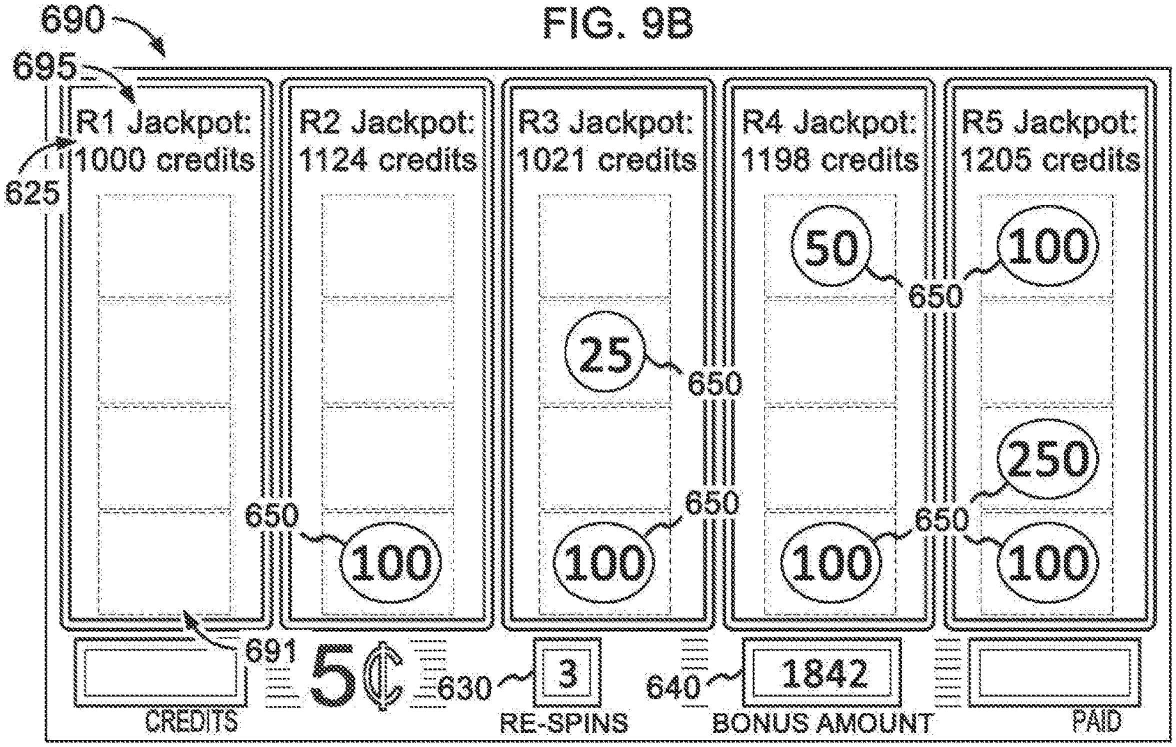

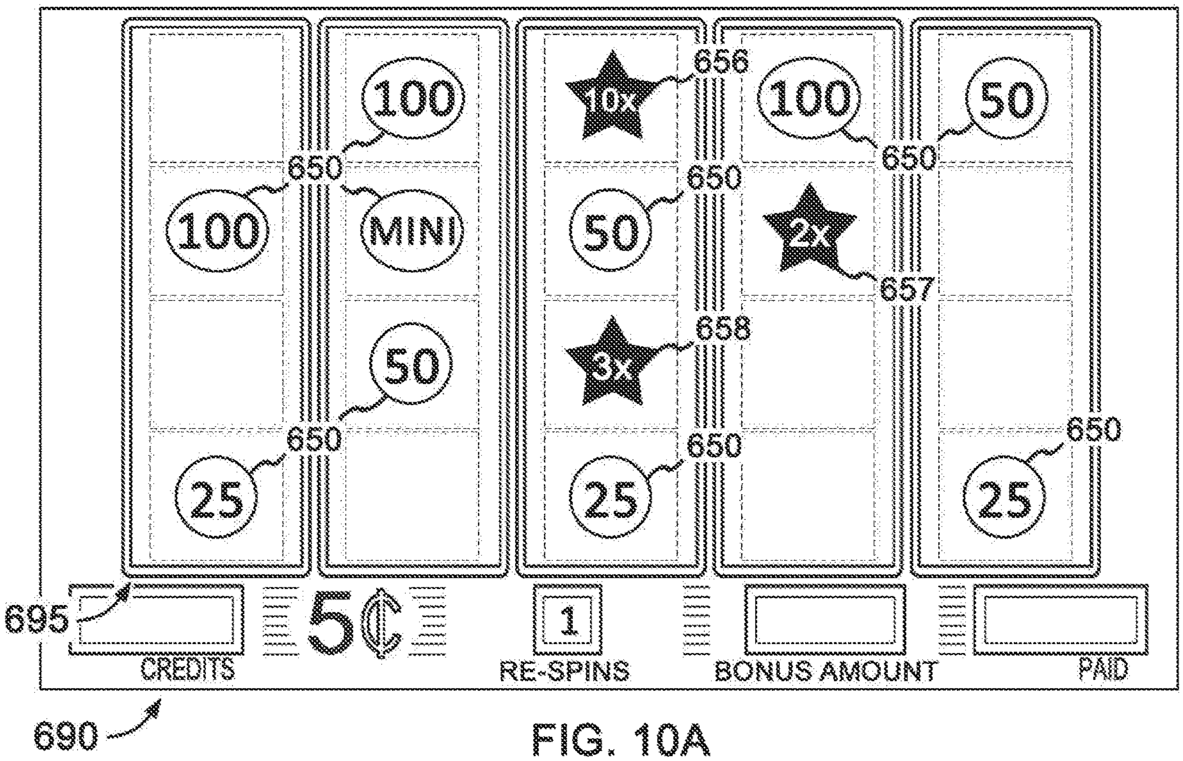
FIG. 10A
FIG. 10B
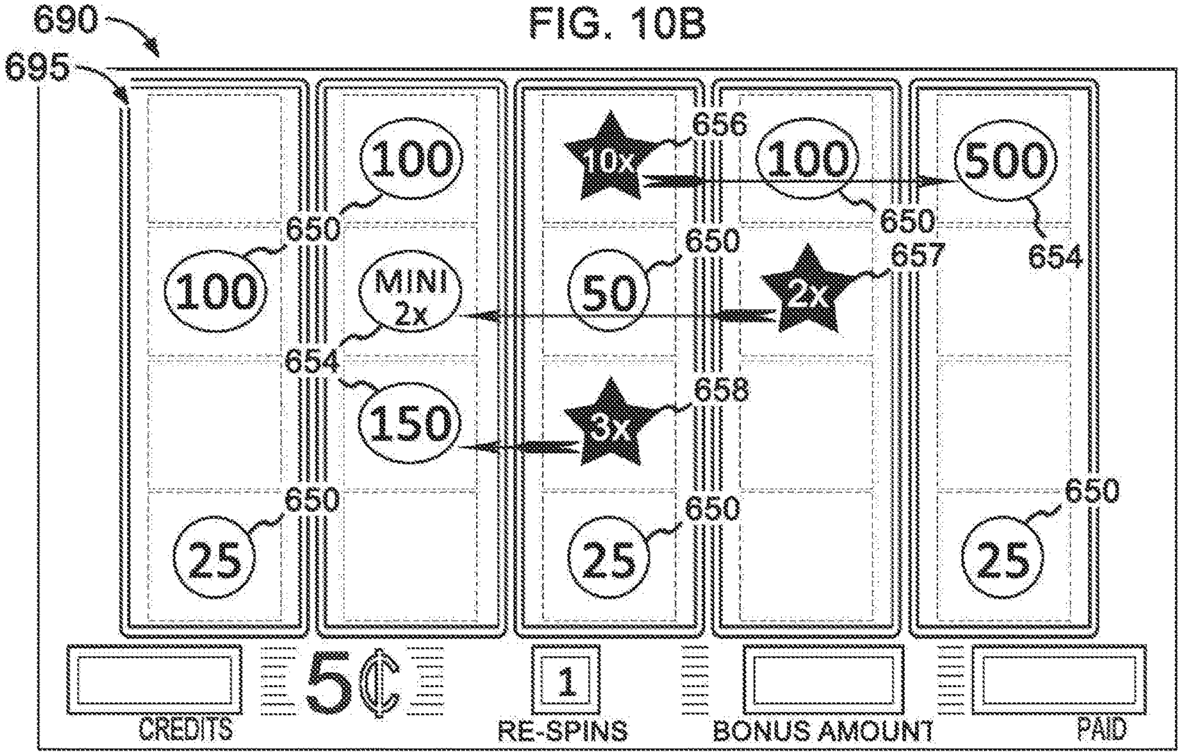

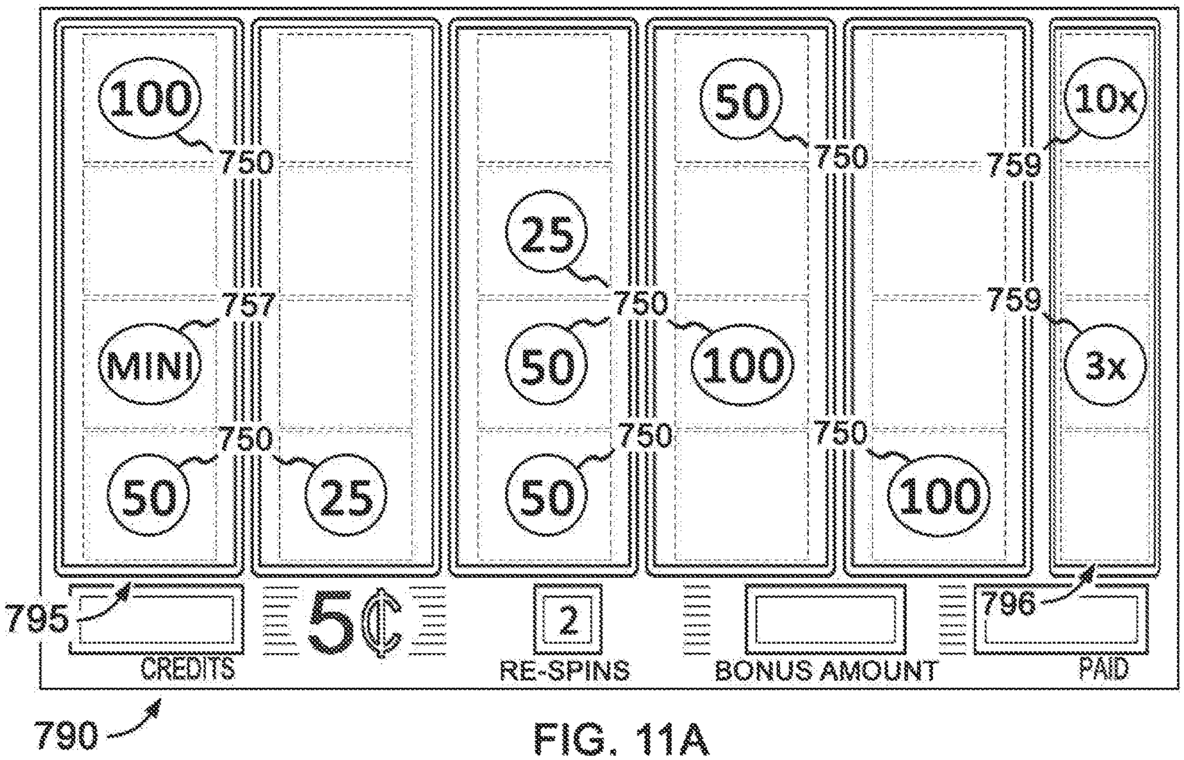
FIG. 11A
FIG. 11B
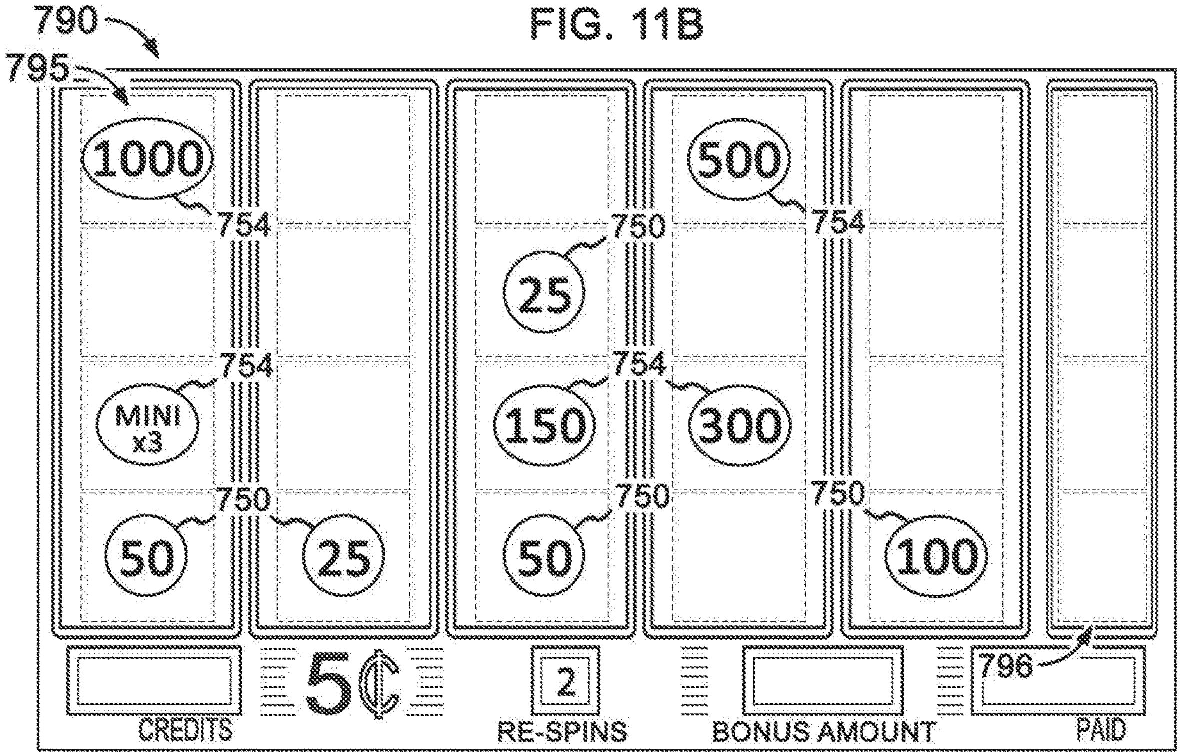

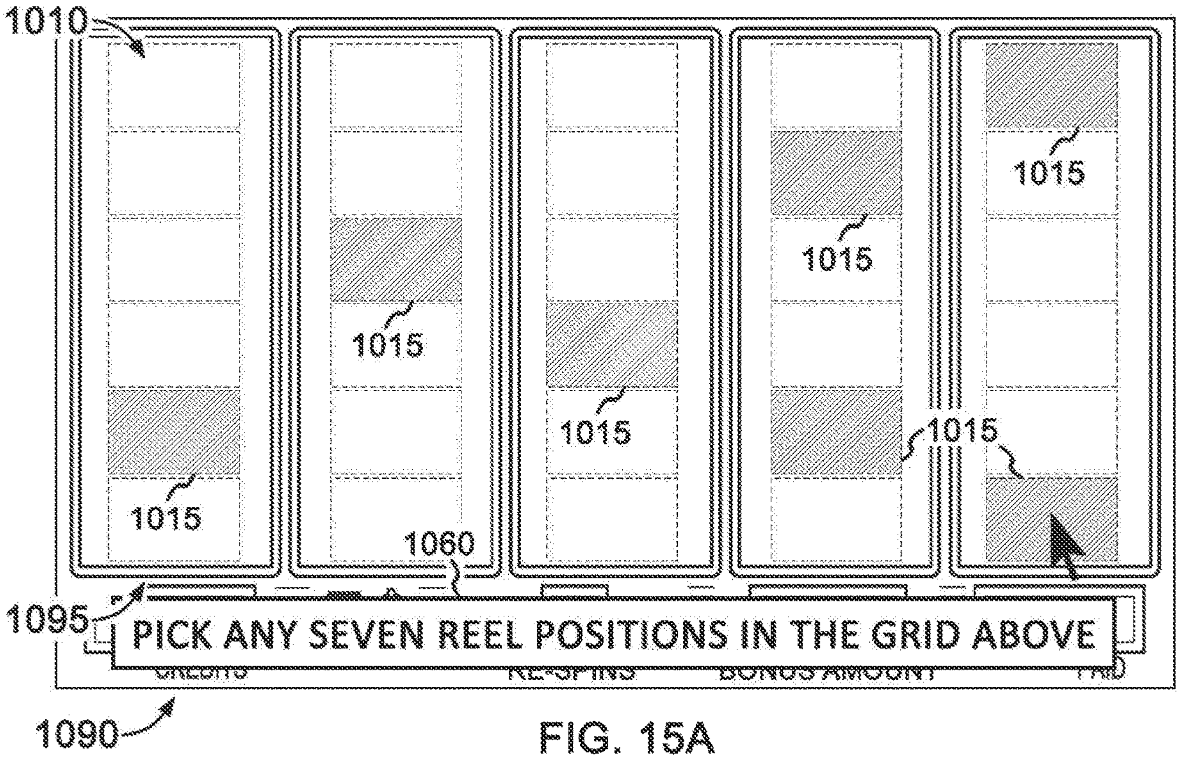
FIG. 15A
FIG. 15B
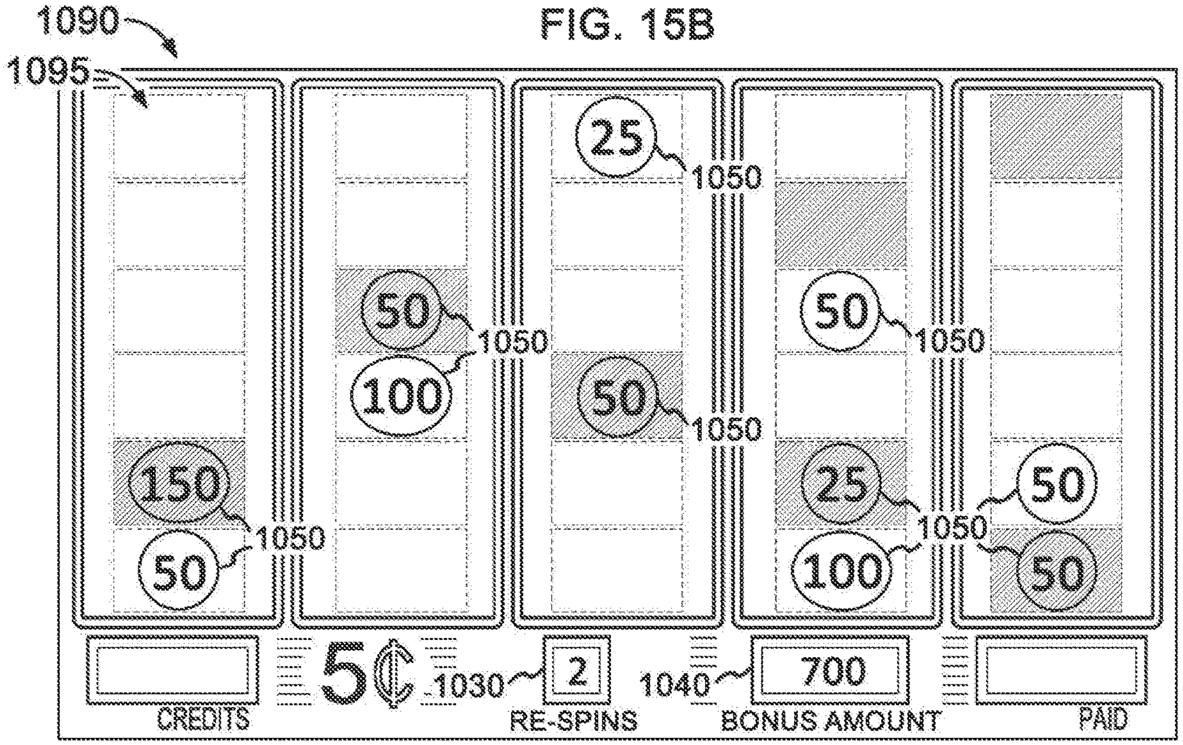

GAMING MACHINE USING MULTIPLE TRIGGERS TO DETERMINE AN AWARD FROM A SUBSET OF DISPLAYED AWARDS

CROSS-REFERENCE TO RELATED APPLICATIONS

This patent application is a continuation of U.S. patent application Ser. No. 17/669,119, filed on Feb. 10, 2022, which is a continuation of U.S. patent application Ser. No. 17/404,370, filed on Aug. 17, 2021, and issued as U.S. Pat. No. 11,710,378, which is a continuation of U.S. patent application Ser. No. 17/365,233, filed on Jul. 1, 2021 and issued as U.S. Pat. No. 11,587,403, which is a continuation of U.S. patent application Ser. No. 16/879,051, filed May 20, 2020 and issued as U.S. Pat. No. 11,094,170, which is a continuation of U.S. patent application Ser. No. 16/800,769, filed Feb. 25, 2020 and issued as U.S. Pat. No. 11,017,638, which is a continuation of U.S. patent application Ser. No. 16/773,243, filed on Jan. 27, 2020 and issued as U.S. Pat. No. 10,957,161, which is a continuation of U.S. patent application Ser. No. 15/910,265, filed on Mar. 2, 2018 and issued as U.S. Pat. No. 10,643,431 on May 5, 2020, which claims the benefit of U.S. Provisional Patent Application No. 62/472,699, filed on Mar. 17, 2017, which applications are hereby incorporated by reference in their entireties.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2020-2023, LNW Gaming, Inc.

FIELD OF THE INVENTION

The present invention relates generally to gaming systems, apparatus, and methods and, more particularly, to using multiple trigger events to determine an award from a subset of displayed awards in a wagering game and improving the operation of a wagering game machine by implementing reel strips and bonus reel symbol display methods that improve the efficiency, speed, and processing demands of one or more bonus games and features in a wagering game.

BACKGROUND OF THE INVENTION

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation. As the industry matures, the creativity and ingenuity required to improve such operation of gaming apparatus and games grows accordingly.

SUMMARY OF THE INVENTION

According to one aspect of the present invention, a gaming system is described comprising a gaming machine and game-logic circuitry. The gaming system may be incorporated into a single, freestanding gaming machine. The gaming machine is primarily dedicated to playing at least one casino wagering game and includes an electronic display device and one or more electronic input devices. The game-logic circuitry is configured to detect a physical item associated with a monetary value that establishes a credit balance, via at least one of the one or more electronic input devices, and initiate the casino wagering game in response to an input indicative of a wager drawn on the credit balance. The electronic display device is directed by the game-logic circuitry to display symbols representing at least a part of an outcome of the casino wagering game in an initial array. In response to a first trigger event in the outcome, a bonus feature is initiated on a bonus array using symbol-bearing bonus reels that include bonus symbols having respective, associated values. The bonus feature includes spinning and stopping the bonus reels through a plurality of bonus spins and populating the bonus array with bonus symbols. In response to an second trigger event, a player is awarded an amount according to the values associated with less than all of the bonus symbols displayed in the bonus array. A cashout input is received via at least one of the one or more electronic input devices, and a payout from the credit balance is initiated.

According to another aspect of the present invention, a casino gaming machine is described that is primarily dedicated to playing at least one casino wagering game. The casino gaming machine includes an electronic display device, one or more electronic input devices, and electronic structural means for performing a particular set of functions. These functions include, via at least one of the one or more electronic input devices, detecting a physical item associated with a monetary value that establishes a credit balance, initiating the casino wagering game in response to an input indicative of a wager drawn on the credit balance, and receiving a cashout input that initiates a payout from the credit balance. During the casino wagering game, the electronic display device is directed to display symbols representing at least a part of a casino wagering game outcome in an initial array, and in response to the outcome including a first trigger event, initiating a bonus feature on a bonus array of symbol-bearing bonus reels including bonus symbols having respective, associated values. The bonus feature includes spinning and stopping the bonus reels through a plurality of bonus spins, populating the bonus array with bonus symbols displayed after each bonus spin, and, in response to an second trigger event, awarding a player according to the values associated with less than all of the bonus symbols displayed in the bonus array.

According to another aspect of the invention, a computer-implemented method in a gaming system is described. The gaming system comprises game-logic circuitry and a gaming machine, wherein the gaming machine includes an electronic display device and one or more electronic input devices and is primarily dedicated to playing at least one casino wagering game. The method comprises at least one of the one or more electronic input devices detecting a physical item associated with a monetary value that establishes a credit balance, initiating the casino wagering game in response to an input indicative of a wager drawn on the credit balance, and receiving a cashout input that initiates a payout from the credit balance. The method also includes directing the electronic display device to display symbols representing at least a part of an outcome of the casino wagering game in an initial array and in response to the outcome including a first trigger event, initiating a bonus feature using bonus array of symbol-bearing bonus reels that include bonus symbols having respective, associated values. The bonus feature includes spinning and stopping the bonus reels through a plurality of bonus spins and populating the bonus array with bonus symbols displayed after each bonus spin. In response to a second trigger event, a player is awarded according to the values associated with less than all of the bonus symbols displayed in the bonus array.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

FIG. 4A is an image of an exemplary basic-game screen of a wagering game displayed on a gaming machine showing an outcome causing a bonus-trigger event, according to an embodiment of the present invention.

FIG. 4B is an image of an exemplary bonus-feature screen of a wagering game displayed on a gaming machine, according to an embodiment of the present invention.

FIGS. 4C-4H are images of an exemplary bonus-feature screen of a wagering game displayed on a gaming machine, according to an embodiment of the present invention.

FIGS. 5B-5E are images of an exemplary bonus-feature screen of a wagering game displayed on a gaming machine having an expanding active region of an array to display bonus symbols to determine an award, according to an embodiment of the present invention.

FIG. 6A is an image of an exemplary basic-game screen of a wagering game displayed on a gaming machine showing a bonus-trigger event, according to an embodiment of the present invention.

FIG. 6B is an image of an exemplary basic-game screen of a wagering game displayed on a gaming machine showing a bonus-trigger event, according to an embodiment of the present invention.

FIG. 6C is an image of an exemplary basic-game screen of a wagering game displayed on a gaming machine showing another bonus-trigger event, according to an embodiment of the present invention.

FIG. 6D is an image of an exemplary basic-game screen of a wagering game displayed on a gaming machine showing yet another bonus-trigger event, according to an embodiment of the present invention.

FIGS. 6E-6F are images of an exemplary basic-game screen of a wagering game displayed on a gaming machine showing compound bonus-trigger events, according to an embodiment of the present invention.

FIG. 7 is an image of an exemplary basic-game screen of a wagering game displayed on a gaming machine having directional and adjacent symbol upgrades, according to an embodiment of the present invention.

FIG. 8 is an image of an exemplary basic-game screen of a wagering game displayed on a gaming machine having an expanded array region causing a bonus-trigger event, according to an embodiment of the present invention.

FIGS. 9A-9B are images of an exemplary bonus-feature screen of a wagering game displayed on a gaming machine having column-based progressive jackpot awards, according to an embodiment of the present invention.

FIGS. 10A-10B are images of an exemplary bonus-feature screen of a wagering game displayed on a gaming machine having feature symbols with multipliers modifying values associated with bonus symbols, according to an embodiment of the present invention.

FIGS. 11A-11B are images of an exemplary bonus-feature screen of a wagering game displayed on a gaming machine having an additional multiplier reel having multiplier feature symbols modifying values associated with bonus symbols, according to an embodiment of the present invention.

FIGS. 15A-15B are images of an exemplary feature screen of a wagering game displayed on a gaming machine using player-picked indicia, according to an embodiment of the present invention.

Figure 1:
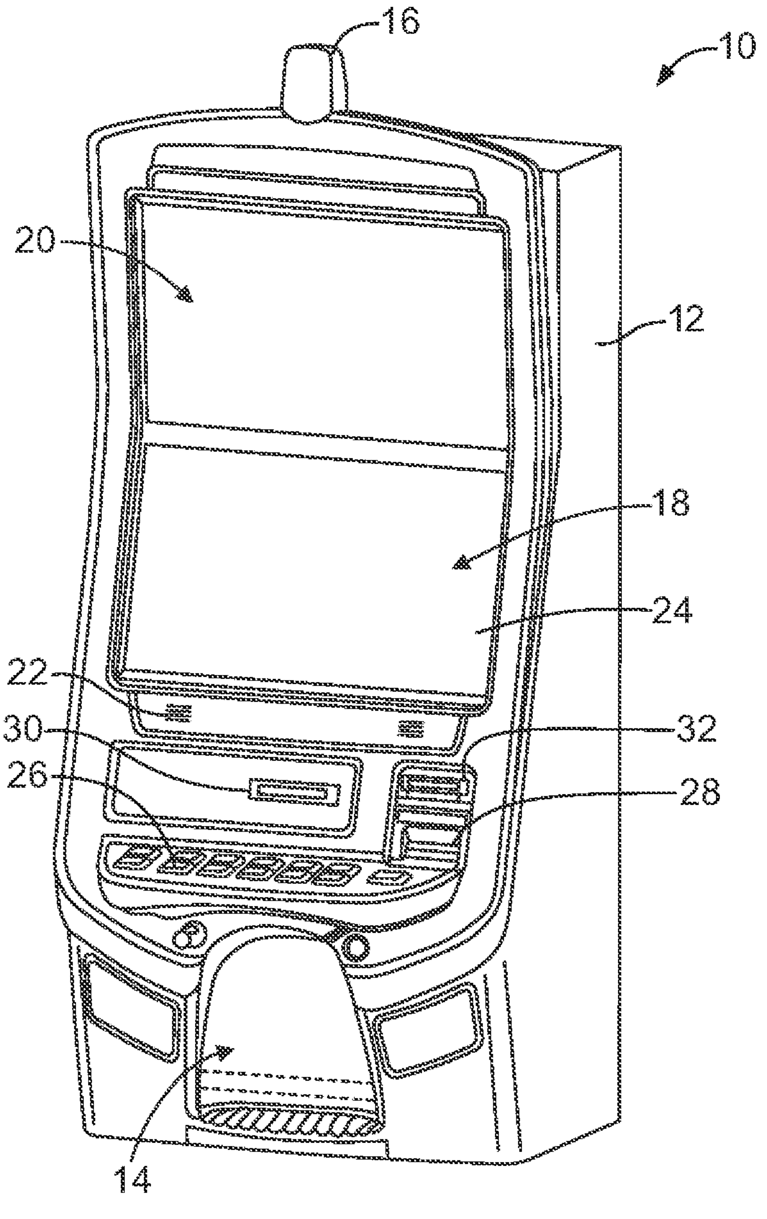
FIG. 1 is a perspective view of a free-standing gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. The cabinet 12 forms an alcove 14 configured to store one or more beverages or personal items of a player. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary display 18, a secondary display 20, and one or more audio speakers 22. The primary display 18 or the secondary display 20 may be a mechanical-reel display device, a video display device, or a combination thereof in which a transmissive video display is disposed in front of the mechanical-reel display to portray a video image superimposed upon the mechanical-reel display. The displays variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 includes a touch screen(s) 24 mounted over the primary or secondary displays, buttons 26 on a button panel, a bill/ticket acceptor 28, a card reader/writer 30, a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter such as the "credits" meter 84 (see FIG. 3). The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. In response to a cashout input that initiates a payout from the credit balance on the "credits" meter 84 (see FIG. 3), the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
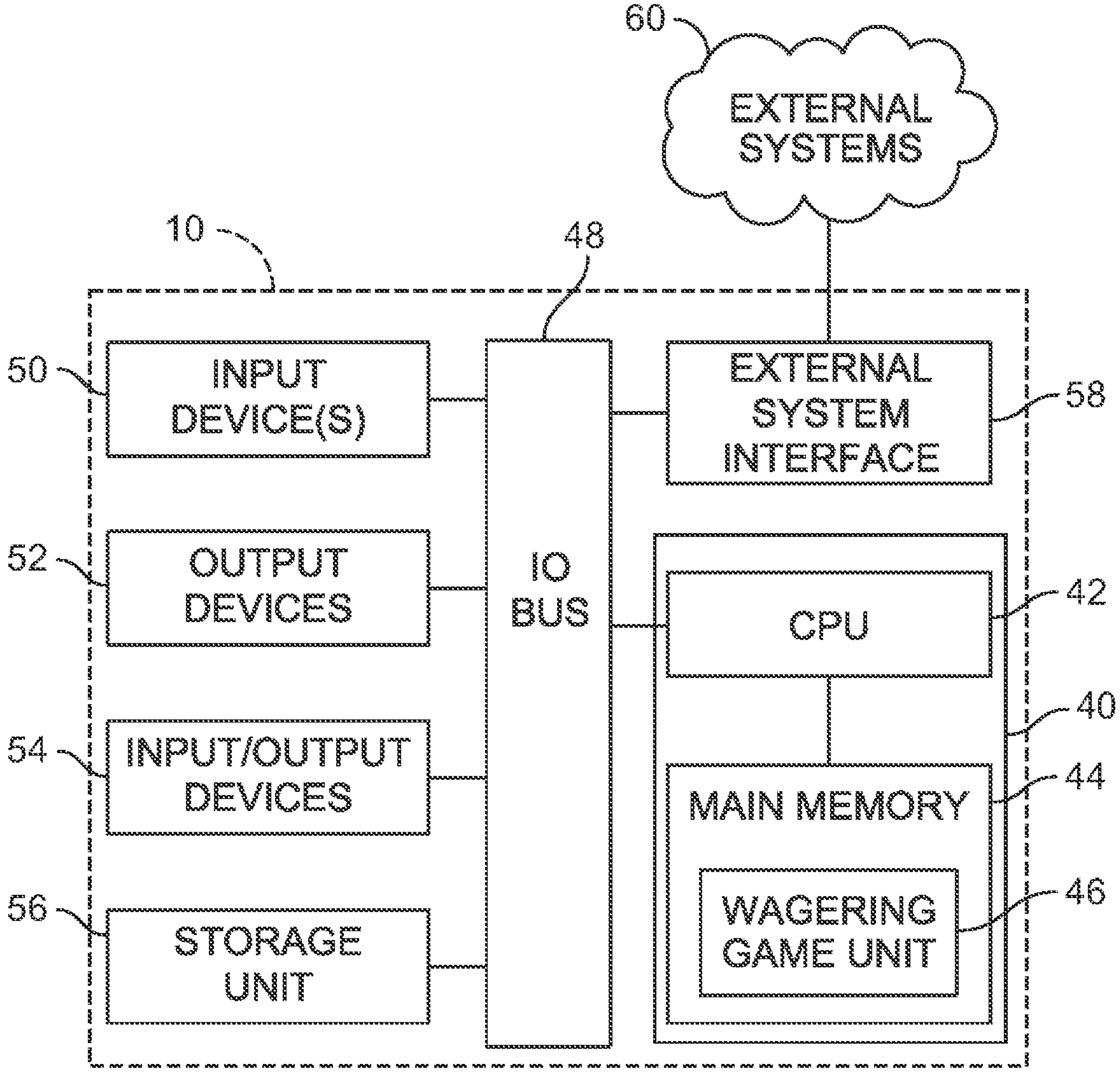
FIG. 2 is a schematic view of a gaming system according to an embodiment of the present invention.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video black jack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)— all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player, for example, at a minimum of 100 Hz (100 calls per second) as set forth in Nevada's New Gaming Device Submission Package. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

Figure 3:
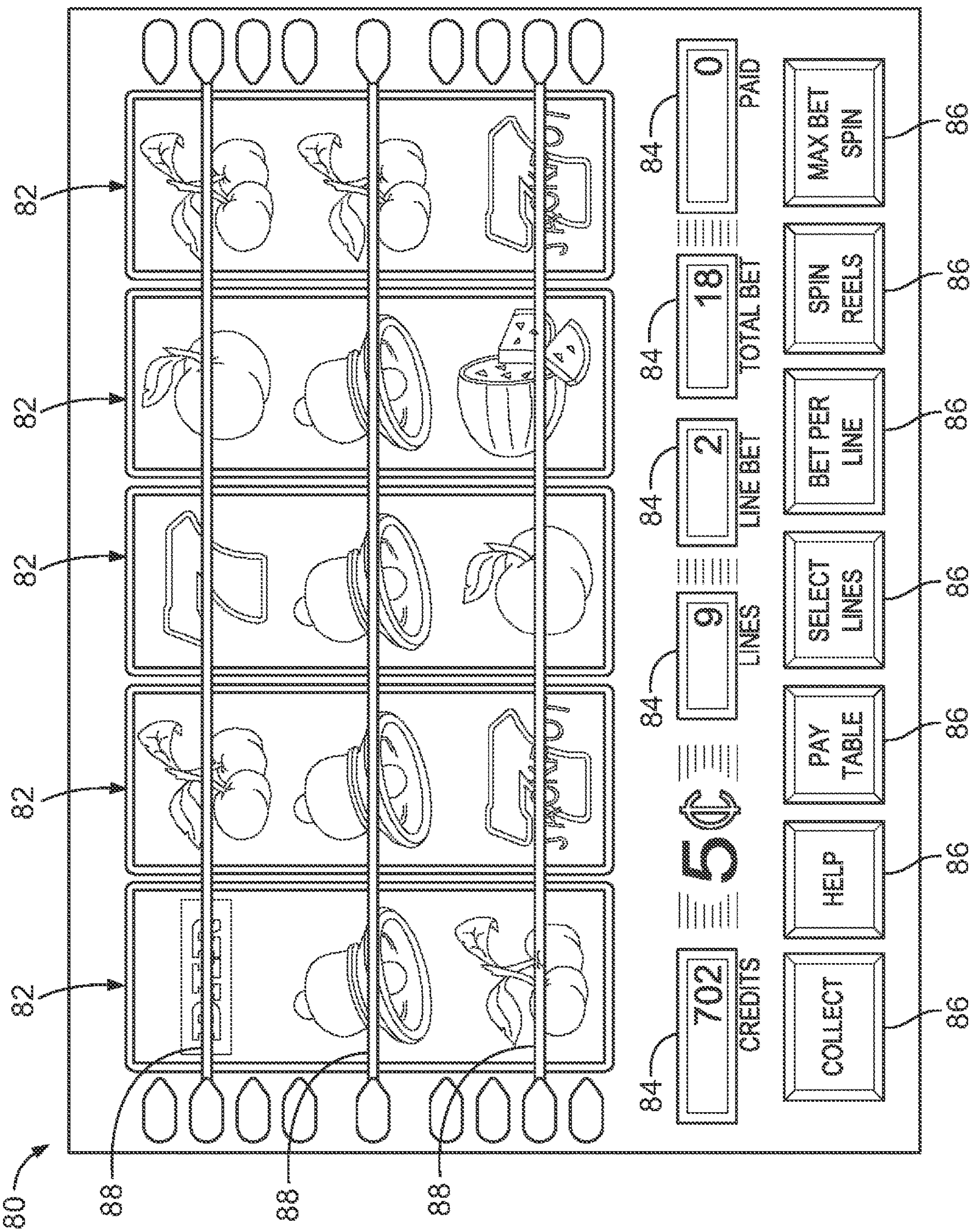
FIG. 3 is an image of an exemplary basic-game screen of a wagering game displayed on a gaming machine, according to an embodiment of the present invention.

Referring now to FIG. 3, there is illustrated an image of a basic-game screen 80 adapted to be displayed on the primary display 18 or the secondary display 20. The basic-game screen 80 portrays a plurality of simulated symbol-bearing reels 82. Alternatively or additionally, the basic-game screen 80 portrays a plurality of mechanical reels or other video or mechanical presentation consistent with the game format and theme. The basic-game screen 80 also advantageously displays one or more game-session credit meters 84 and various touch screen buttons 86 adapted to be actuated by a player. A player can operate or interact with the wagering game using these touch screen buttons or other input devices such as the buttons 26 shown in FIG. 1. The game-logic circuitry 40 operates to execute a wagering-game program causing the primary display 18 or the secondary display 20 to display the wagering game.

In response to receiving an input indicative of a wager drawn on or deducted from the credit balance on the "credits" meter 84, the reels 82 are rotated and stopped to place symbols on the reels in visual association with paylines such as paylines 88. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary display 18 or secondary display 20) through the display of information such as, but not limited to, text, graphics, static images, moving images, etc., or any combination thereof. In accord with the method of conducting the wagering game, the game-logic circuitry 40 transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary display 18, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in other gaming jurisdictions. As can be seen from the description herein, the gaming machine 10 may be implemented with hardware and software architectures, circuitry, and other special features that differentiate it from general-purpose computers (e.g., desktop PCs, laptops, and tablets).

Referring now to FIG. 4A, an image of a basic-game screen 180 adapted to be displayed on the primary display 18 or the secondary display 20 is shown in one embodiment. The basic-game screen 180 shows a symbol-bearing basic-game initial array 185 displaying a set of randomly determined symbols. The displayed symbols include a combination of non-bonus symbols 110 and bonus symbols 150. The plurality of symbols may be generated by motion of mechanical reels consistent with the game format and theme. In one embodiment, each symbol of the initial array 185 is determined independently using an associated symbol-bearing reel for each corresponding array position. In another embodiment, a subset of array positions in the initial array 185 have symbols determined collectively, e.g., using a single reel spanning multiple adjacent positions of the initial array 185.

In some cases, a bonus-trigger event occurs as part of the basic-game outcome and initiates a bonus feature. Bonus-trigger events may be based on the displayed symbols of the basic-game outcome, may be separately determined (e.g., using a RNG "mystery trigger"), or be based on a combination of these. In one embodiment, a bonus-trigger event occurs in response to the display of a threshold number of bonus symbols, such as the six bonus symbols 150 in the initial array 185. A bonus-trigger event may include any criteria or symbol combination, such as a different minimum number of bonus symbols displayed in a basic-game outcome and should not be specifically limited to this particular embodiment.

Referring now to FIG. 4B, a bonus-feature screen 190 comprising a symbol-bearing bonus-feature bonus array 195 is shown in one embodiment. The bonus-feature screen 190 is displayed in response to a bonus-trigger event (e.g., the display of six bonus symbols in the initial array 185). In one embodiment, the bonus array 195 is formed by adding entire rows of array element positions (e.g., rows 192, 193, 194) to the initial array 185 and carrying over the bonus symbols 150 of the initial array 185 to the bonus array 195. In another embodiment, all the symbols are carried over to the bonus array 195. In yet other embodiments, a subset of bonus symbols 150 are carried over to the bonus array 195, determined randomly or as a result of a position in the initial array 185, or the bonus array may be populated with all new symbols. Symbols in the bonus array may not be available in the initial array.

In one embodiment, different types of bonus symbols 150 may be displayed and carried over into the bonus array 195 from the initial array 185. The different types of bonus symbols 150 may have different associated values or traits consistent to that type. Alternatively, each of the different types of bonus symbols 150 may have different associated values. As an example, a first set of "low" bonus symbols may have associated values in the range of 50-200 credits (randomly determined), while a second set of "high" bonus symbols has associated values in the range of 500-1000 credits.

In one embodiment, the bonus-trigger event initiates a bonus feature that includes performing a plurality of bonus spins. A bonus feature may include spinning and stopping a set of bonus reels through a plurality of bonus spins, populating the bonus array with bonus symbols displayed after each bonus spin. In one embodiment, each bonus symbol 150 has a respective associated value corresponding to an associated award awarded to a player in response to an award-trigger event (e.g., a predetermined symbol combination occurring in the bonus array during the bonus spins). An associated value for a particular bonus symbol may be predetermined or randomly determined when the bonus symbol is displayed. The value associated with a bonus symbol may be displayed as part of the bonus symbol or remain hidden until an award-trigger event occurs. In some embodiments, an associated value is displayed with each bonus symbol. In other embodiments, an associated value is displayed for a specific subset of the displayed bonus symbols. For example, in response to a specific type of award-trigger event (e.g., filling a row of a bonus array with bonus symbols 150), only some of the displayed bonus symbols 150 would display an associated value. An associated credit value may be related to a position of the bonus symbol 150 in the bonus array (e.g., higher credit values occur at positions in higher rows of the bonus array).

Referring now to FIG. 4C, the bonus-feature screen 190 comprising a bonus array 195 is shown in one embodiment. In one embodiment, the non-bonus symbols 110 are removed from the bonus array 195 and the bonus symbols 150 drop to the lowest available unoccupied position of the same column in the bonus array 195. Alternatively, the bonus symbols 150 may remain stationary in a specific position of the bonus array 195 for the duration of the bonus feature.

A spin counter 132 is displayed showing a number of bonus spins remaining for the bonus feature. Any number of initial bonus spins may be assigned at the initiation of the bonus feature, e.g., the spin counter 132 is set to a predetermined value or a value determined randomly. Each performed bonus spin decrements the spin counter 132 and determines a symbol for display at each symbol position of the bonus array 195. In one embodiment, random symbols are chosen for positions of the bonus array 195 not displaying a bonus symbol 150. The random symbols may be determined using bonus reel strips containing only blank symbols and bonus symbols 150. In one embodiment, the performed bonus spins continue during the bonus feature as the bonus spins are decremented until depleted (as displayed on the spin counter 132).

In one embodiment, a symbol counter 134 is provided to display a number of bonus symbols 150 displayed in the bonus array 195. Alternatively, the symbol counter 134 may display the number of bonus symbols displayed during the most recent bonus spin or a number of additional bonus symbols required for a reset event or award-trigger event (e.g., in regard to a specific jackpot). An award meter may also be used to display a running total of an award amount corresponding to the value associated with one or more bonus symbols 150.

In response to a reset event, the number of bonus spins for the bonus game is incremented. A reset event may be randomly triggered or be triggered by a predetermined symbol combination displayed in the bonus array 195 during the bonus spins. For example, a reset event may be triggered by an additional bonus symbol (not shown) being newly displayed in the bonus array 195 during the most recent completed bonus spin. In another embodiment, a reset symbol combination may trigger a reset event when displayed as part of the bonus array 195 (not shown). The completion of a row or column of bonus symbols within the bonus array 195, a predetermined number of displayed bonus symbols, a particular additional bonus symbol, or a bonus symbol in one or more particular positions of the bonus array 195 may trigger a reset event to increment the spin counter 132. In response to the reset event, the number of bonus spins may be incremented a predetermined value, be incremented up to a particular predetermined value, or be incremented based on one or more random numbers.

Referring now to FIG. 4D, the bonus array 195 is displayed after a bonus spin has been conducted in one embodiment. In response to initiating the bonus spin, the number of bonus spins is decremented, the spin counter 132 is updated accordingly, and symbols are determined for each vacant position of the bonus array 195. In one embodiment, a bonus spin randomly determines a symbol for each array position of the bonus array 195 not currently displaying a bonus symbol 150. In one embodiment, a corresponding bonus reel comprising only blank symbols and bonus symbols 160 is used to determine and display a symbol for each of the vacant positions of the bonus array 195. As a result of each bonus spin, one or more vacant positions of the bonus array 195 may become populated with corresponding additional bonus symbols 160. In one embodiment, a predefined set of independent bonus reels are used for randomly determining a symbol for each vacant array position. In one embodiment, the bonus reels contains only bonus symbols and blank symbols and display only bonus symbols while the reels are spinning. In another embodiment, all non-bonus symbols on a set of basic-game reel strips are replaced with blank symbols to define bonus reel strips for the set of bonus reels. In other embodiments, the bonus reels may include symbols and symbol configurations that are only available during bonus spins of the bonus feature. In many cases, the use of dynamically generated bonus reel strips reduces processing necessary for symbol determination and display. The restriction of reel symbols on the reel strips to include only bonus symbols and blank symbols reduces the complexity of mapping of random numbers to a particular symbol (e.g., via an associated look-up table) in addition to reducing the required graphical processing during display. For example, the display of blank symbols in place of iconic bonus symbols is less computationally demanding than rendering full in-motion imagery and graphics necessary during the spin of a basic-game reel. The speed of determining and displaying a particular symbol at an array position may also be reduced due to blank symbols on the bonus reel strips. For example, if an RNG call results in determination of a blank symbol for display at a particular array position, no symbols need to be displayed and no processing is required to produce an outcome, limiting symbol display and processing to particular array positions. Further, the way a displayed bonus symbol is determined is improved. The removal of any non-bonus symbols from a bonus reel strip provides a mechanism for on-the-fly dynamic configuration of reels using a reduced reel strip size that is more efficient than longer reel strips composed of sets of static symbols. The removal of symbols that will never be displayed also provides a way to save power over a long period of time and reduces generated heat, usage demand, and wear and tear for LCD elements of display devices of the gaming machines.

Referring now to FIG. 4E, the additional bonus symbols 160 (FIG. 4D) become bonus symbols 150 as they drop to the lowest available unoccupied position of the bonus array 195 within their respective columns as shown in one embodiment. At least one bonus spin remains (as reflected in the spin counter 132), so another bonus spin is due to be performed using the bonus reels for determining and displaying symbols for each position of the bonus array 195 not already displaying a bonus symbol 150.

Referring now to FIG. 4F, another bonus spin is performed wherein the number of bonus spins reflected on spin counter 132 is decremented and the bonus reels are again used to randomly determine symbols for the vacant array positions of the bonus array 195. The additional bonus symbols 160 are determined and displayed by spinning and stopping the bonus reels during the bonus spin.

Referring now to FIG. 4G, the additional bonus symbols 160 (shown in FIG. 4F) become bonus symbols 150 after dropping to the lowest available unoccupied position of their respective column as shown in one embodiment. In one embodiment, the bonus symbols 150 filling the lowest row of the bonus array 195 is criteria to trigger a reset event. A reset event increments the bonus spins for the bonus feature (e.g., as reflected in the spin counter 132). In another embodiment, the display of any additional bonus symbol 160 is a reset event, incrementing the bonus spins. The bonus spins for the bonus feature may be incremented a predetermined amount, be incremented until the spin counter is a predetermined value, or be randomly determined. In one embodiment, a reset event increments the bonus spins until three bonus spins remain and correspondingly updates the spin counter 132. Reset event triggers may vary in different embodiments and may include filling of a row or column of the symbol array, filling of a predetermined or randomly determined pattern in the array, display of one or more particular symbols in the array, may be the result of an independent random event, an independently determined random number, etc., or any combination of these.

Referring now to FIG. 4H, the occurrence of bonus symbols 150 filling a row of the bonus array 195 meets criteria for an award-trigger event as shown in one embodiment. In response to the award-trigger event, an award is determined and displayed based on the respective, associated values of the bonus symbols 150 meeting the criteria. In one embodiment, an award is tabulated and displayed in an award meter 175 and is awarded to the player (e.g., either immediately or following conclusion of the bonus feature). In another embodiment, a feature-trigger event occurs in response to filling a row with bonus symbols 150, incrementing a new additional spin counter. The additional spin counter results in spinning an additional bonus reel or bonus wheel a corresponding number of times (e.g., conducted at the end of the bonus feature). For example, an additional bonus wheel having a specific set of awards thereon is spun once for each bonus spin reflected in the new additional spin counter as the bonus feature concludes. Alternatively, each completed row is a feature-trigger event causing a bonus reel/wheel to be spun immediately (potentially resulting in a corresponding award-trigger event and/or additional feature-trigger event). In yet another embodiment, a progressive jackpot is associated with each column of the bonus array 195 and a corresponding progressive award-trigger event occurs in response to filling a column with bonus symbols 150. A variety of other criteria and embodiments may be used for implementing award-trigger events and/or feature trigger events without departing from the spirit and scope of the invention.

It is noted that the award-trigger event results in a determined award that may be based on less than all of the bonus symbols 150 of the bonus array 195. The predetermined criteria of an award-trigger event may include any combination of bonus symbols that are arranged in various ways during display. Examples include combinations of bonus symbols in completed rows, columns, or other predetermined symbol patterns, the presence of a particular bonus symbol in the bonus array or at a particular position of the array, a threshold number of displayed bonus symbols, an independently determined random trigger, comparison to a value or position corresponding to player-selected indicia input, etc.

Depending upon the specific embodiment, various actions may be taken with the bonus symbols 150 after an award is tabulated. For instance, the bonus symbols 150 meeting award criteria may be removed from the bonus array 195 prior to any additional bonus spins (additionally causing remaining bonus symbols 150 to drop to the lowest available unoccupied position of the bonus array 195 in one embodiment). In other embodiments, an award-trigger event causes the bonus feature to conclude and grant the determined award. In yet other embodiments, a particular type of award symbol 150 (or other set of conditions) removes all bonus symbols 150 in the bonus array 195 and restarts the bonus feature using new bonus reels having new bonus symbols with higher associated values. Additional events, triggers, or predetermined combinations of award symbols 150 may also impact associated values of other bonus symbols 150 being used to tabulate awards. Further, bonus features may employ bonus symbols 150 that drop to the lowest available unoccupied position of the array (as above) or employ static bonus symbols 150 that do not change array positions (upcoming).

Figure 5A:
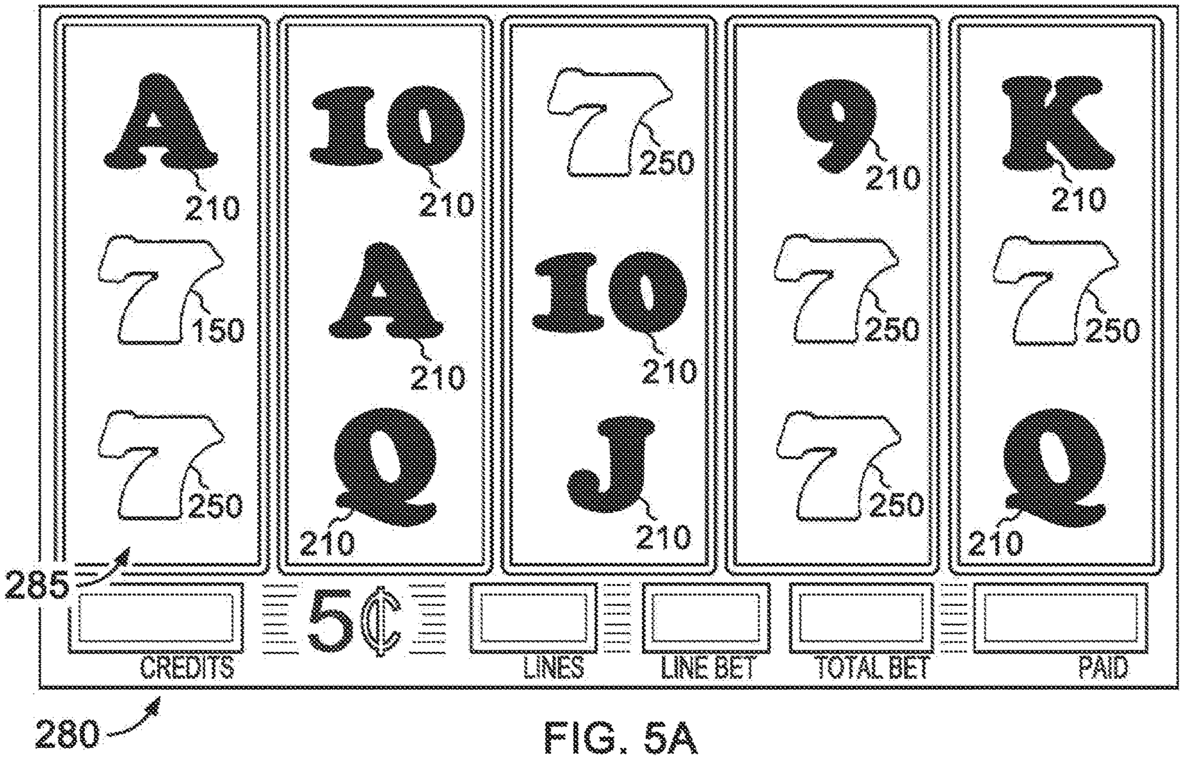
FIG. 5A is an image of an exemplary basic-game screen of a wagering game displayed on a gaming machine showing an outcome causing a bonus-trigger event, according to an embodiment of the present invention.

Referring now to FIG. 5A, an image of a basic-game screen 280 adapted to be displayed on the primary display 18 or the secondary display 20 is shown in one embodiment. The basic-game screen 280 shows a symbol-bearing basic-game initial array 285 displaying a set of randomly determined symbols. The displayed symbols include a combination of non-bonus symbols 210 and bonus symbols 250. Alternatively or collectively, the displayed symbols are generated at positions of the initial array 285 by motion of mechanical reels or simulated motion of virtual reels consistent with the game format and theme. In one embodiment, each symbol of the initial array 285 is displayed using an independent symbol-bearing reel. In other embodiments, a set of positions of the initial array 285 (e.g., each column) use the same symbol-bearing reel for displaying symbols. In one embodiment, a bonus-trigger event occurs in response to the display of a threshold number of bonus symbols, such as the six bonus symbols 250 in the initial array 285. That is, the displayed bonus symbols 250 in the initial array 285 is a bonus-trigger event that initiates a bonus feature.

Referring now to FIG. 5B, an image of a bonus-feature screen 290 adapted to be displayed on the primary display 18 or the secondary display 20 is shown in one embodiment. The screen 290 comprises a symbol-bearing bonus array 295 that shows bonus symbols 250 carried over from the basic-game initial array 285 of the wagering game. When the basic game in this embodiment triggers the bonus feature, new rows 296-299 are added to the initial array 285 to form the bonus array 295 and an associated award amount for each bonus symbol 250 is displayed.

In one embodiment, at least one bonus reel strip is implemented on at least one bonus reel to determine a symbol for each position of the bonus array 295 during each bonus spin. Each bonus reel strip comprises symbols arranged in a particular way and may vary considerably from the basic-game reel strips used on the basic-game reels. In one embodiment, spinning and stopping the bonus reels through a plurality of bonus spins are performed, wherein randomly determined symbols are displayed at various positions of the bonus array 295 following each bonus spin. The displayed symbol for each position relates to the symbols on the corresponding bonus reel (e.g., blank symbols or bonus symbols). The bonus reels may be specifically constructed to reduce processing demands during repeated symbol display during bonus spins, thereby improving operation of the gaming machine as a whole. Likewise, other performance considerations may include performing bonus spins faster and more efficiently and minimizing the time to conduct each bonus spin and the bonus feature, and reducing rendering time, processing, and display element wear during repeated operation. Efficiencies can also be gained for the simplified mapping of RNG results to particular (non-blank) bonus symbols using reduced-size reel strips. For example, symbols having no impact on an award in the outcome may be removed from the bonus reel strips, resulting in a simplified weighted table that maps random numbers to fewer bonus symbols (improving processing speed and gaming machine operation).

In one embodiment, the bonus array 295 includes a combination of locked and unlocked rows, wherein the bonus symbols 250 in an unlocked row contribute to criteria for an award-trigger event. In one embodiment, the rows 291, 292, 293 of the bonus array 295 corresponding to the rows of the initial array 285 are automatically unlocked at the start of the bonus feature. Each of the bonus symbols 250 displayed in the unlocked rows have an associated value that contributes to a player award in response to an award-trigger event (e.g., depletion of all bonus spins). The associated value for each displayed bonus symbol 250 may be displayed as part of the bonus symbol 250 (e.g., when spinning the basic-game reels or when carried over to the bonus array 295). Alternatively, the associated value for a bonus symbol 250 remains hidden until an award-trigger event occurs. In one embodiment, the display of a bonus symbol 250 itself may be an award-trigger event (e.g., instantly awarding the associated value).

In one embodiment, the display of a threshold number of bonus symbols in the unlocked rows triggers the unlocking of additional rows of the bonus array 295. That is, the number of bonus symbols displayed in presently unlocked rows determines whether the rows 296, 297, 298, 299 become unlocked during the bonus feature when a specific threshold is reached. As an example, the row 296 becomes unlocked in response to eight or more bonus symbols displayed in the rows 291, 292, 293 (corresponding to the initial array 285). The row 297 becomes unlocked in response to twelve or more bonus symbols displayed in the rows 291, 292, 293, 296, the row 298 becomes unlocked in response to sixteen or more bonus symbols displayed in the rows 291, 292, 293, 296, 297, and all the rows 291-293, 296-299 of the bonus array 295 become unlocked in response to twenty or more bonus symbols displayed in the rows 291, 292, 293, 296, 297, 298.

In other embodiments, the unlocked portions of the bonus array 295 may change in response to other criteria or trigger events. For example, only positions of the bonus array 295 having bonus symbols adjacent to each other (e.g., horizontally, vertical, and/or diagonally) will become unlocked. In other embodiments, displayed bonus symbols in filled rows/columns, in specific configurations, in the entire bonus array 295, exceeding a predetermined threshold, in response to a particular event or condition, etc., or any combination of these may be used to unlock one or more portions of the bonus array 295 resulting in a value associated with the bonus symbols in the unlocked portions to be awarded to the player. Further, the expansion of the initial array 285 to form the bonus array 295 may occur in more than one direction and by any magnitude, for example, expanding the initial array 285 in all directions by a predetermined or random amount. In one embodiment, the values associated with the bonus symbols 250 tend to increase with distance from the position of the initial array 285, but this is not a requirement and all the bonus symbols 250 determined for positions of the bonus array 295 may be independent from all others. The number of array positions in the initial 285, array positions in the bonus array 295, required bonus symbols for row unlocking, reels and reel strips, number of bonus spins per reset event, number of award or jackpot bonus symbols, unlocking criteria, etc., are all subject to modification while still being within the spirit and scope of the invention.

Referring now to FIG. 5C, an image is shown of the bonus-feature screen 290 following the spinning and stopping of the bonus reels after one or more bonus spins in one embodiment. As additional bonus spins are performed, randomly determined symbols are displayed in the bonus array 295 and the number of bonus symbols in the bonus array 295 may increase. The bonus symbols displayed in the bonus array 295 may include the bonus symbols 250, additional award bonus symbols 252 (positioned inside an unlocked portion of the bonus array 295), and additional non-award bonus symbols 254 (positioned outside the unlocked portion of the bonus array 295).

In one embodiment, the bonus symbols 250, 252, 254 that are determined and displayed during the bonus feature do not move from one position to another within the bonus array 295. That is, as the bonus symbols 250, 252, 254 are displayed in the bonus array 295, they remain in place, are not re-spun during subsequent bonus spins, and do not change position in the bonus array 295. In other embodiments, other types of features may be utilized (e.g., bonus symbols that drop to the lowest available unoccupied position of the column as discussed prior). In yet other embodiments, predetermined criteria may trigger one or more bonus symbols to change position in the bonus array 295, and/or re-spin (e.g., in response to displaying a special bonus symbol, one or more bonus reels re-spin using a different reel strip having bonus symbols with higher values, re-spinning all bonus symbols directly adjacent to a particular array position, increasing the associated award amount of adjacent bonus symbols, etc.). An additional non-award bonus symbol 254 may become a bonus symbol 250 or an additional award bonus symbol 252 if shifting into an unlocked portion of the bonus array 295 (e.g., as a result of a feature) or the position becomes unlocked.

Each displayed bonus symbol 250 and additional award bonus symbol 252 (within the unlocked portion of the bonus array 295) may have an associated value awarded to a player in response to an award-trigger event. In one embodiment, additional non-award bonus symbols 254 not positioned within an unlocked portion of the bonus array 295 do not contribute to or result in an award to the player. Each of the bonus symbols 250, 252, 254 are associated with an award amount that may include progressive jackpots that are randomly or otherwise determined for the bonus feature. The set of available progressive awards ranges from a lowest progressive jackpot (MINI) to a largest progressive jackpot (MEGA). A progressive jackpot may be awarded in response to an award-trigger event, such as display of a corresponding symbol or set of symbols associated with the progressive jackpot. An award-trigger event for higher progressive jackpots may be contingent upon achieving criteria for a lower progressive jackpot before becoming eligible for the next highest progressive jackpot. In other embodiments, predefined sets of bonus symbols 250 (types and/or configurations) may be required to trigger a specific or progressive award.

In one embodiment, a spin counter (not shown) is decremented each time a bonus spin is conducted. A reset event may increment the spin counter. In one embodiment, a reset event occurs in response to bonus symbols displayed during the most recent bonus spin that result in a reset symbol combination (e.g., one or more additional bonus symbols 252 in an unlocked portion of the bonus array 295).

Referring now to FIG. 5D, the display of the additional bonus symbols 252 causes the array positions of row 297 to become unlocked based on the number of bonus symbols 250 in the presently unlocked rows. The bonus symbols 255 in the row 297 increase the count of bonus symbols further, causing the row 298 to become unlocked. The bonus symbols 255 in row 298 further increase the number of bonus symbols in the unlocked portion of the array 295, but the required threshold is not met to unlock row 299. While each of the bonus symbols inside the unlocked portion of the bonus array 295 have an associated value that contributes to an award to the player for the bonus feature, the additional non-award bonus symbols 254 in the row 299 are not in an unlocked portion of the bonus array 295 and do not contribute to the determined award.

Referring now to FIG. 5E, a plurality of bonus spins are conducted and a spin counter (not shown) is decremented until there are no remaining bonus spins to perform (the bonus spins are depleted). The depletion of the bonus spins is an example of an award-trigger event so an award is determined based upon the associated values of the bonus symbols 250, 257 displayed in the outcome (e.g., as reflected in an award meter, not shown). In one embodiment, awarding one or more progressive jackpots may be triggered in response to display of a bonus symbol (e.g., bonus symbol 257) in an unlocked portion of the bonus array 295. In other embodiments, additional criteria may be required to trigger an award having a value associated with the displayed bonus symbols 257 for a progressive jackpot, e.g., display of a minimum threshold of displayed bonus symbols 257. In one embodiment, a MINI progressive jackpot award-trigger event may occur in response to display of three bonus symbols 257 for awarding the MINI progressive jackpot. Alternatively, each bonus symbol 257 may trigger a separate MINI progressive jackpot award, resulting in awarding three MINI jackpot awards (one for each bonus symbol 257).

Referring now to FIG. 6A, there is illustrated an image of a basic-game screen 380 adapted to be displayed on the primary display 18 or the secondary display 20 during a wagering game in one embodiment. The basic-game screen 380 shows a symbol-based basic-game initial array 385 after all the reels have stopped spinning and all the symbols are displayed. The initial array 385 comprises a combination of non-bonus symbols 310, bonus symbols 350, and a feature symbol 351 at the array position specified by a feature indicator 305. The bonus symbols 350 have respective associated values that may or may not be immediately displayed. The feature indicator 305 points to a designated position of the initial array 385 (e.g., a specific reel and associated position) in one embodiment. The position designated by the feature indicator 305 may be randomly determined. When the reels of the initial array 385 stop spinning, a feature symbol 351 displayed at the position specified by the feature indicator 305 is a feature-trigger event that may alter the initial array 385. For example, the feature symbol 351 may modify the initial array 385 such that additional bonus-trigger events, award-trigger events, or feature-trigger events occur, such as increasing the number of bonus symbols and triggering a bonus feature, or causing an award-trigger event that instantly awards a value associated with one or more bonus symbols 350. In one embodiment, the feature-trigger event is a bonus-trigger event that causes a bonus feature to initiate. Any feature-trigger events may also be dependent upon the placement of an additional wager or fee by a player prior to initiation of the wagering game, one or more random number selections, or determined by various other criteria.

In other embodiments, a feature-trigger event is caused by various criteria. For example, a feature-trigger event may occur in response to the initial array 385 displaying a predetermined number of bonus symbols 350 or displaying a predetermined number of feature symbols 351 without displaying a feature indicator 305 at all. Further, a feature-trigger event may occur in response to displaying a feature symbol 351 in a particular position of the initial array 385, displaying a combination of non-bonus symbols 310, bonus symbols 350, or feature symbols 351 in a plurality of positions of the initial array 385 (with or without a feature indicator 305), etc. In one embodiment, a feature-trigger event occurs as a result of a random number being within a specific range or having a specific value (e.g., a "mystery" trigger), and a corresponding feature indicator 305 is placed at a random position in the initial array 385.

Referring now to FIG. 6B, there is illustrated an image of a basic-game screen 381 adapted to be displayed on the primary display 18 or the secondary display 20 during a wagering game in one embodiment. The basic-game screen 381 shows a symbol-based basic-game initial array 386 after all the reels have stopped spinning and all the symbols are displayed. The initial array 386 comprises a combination of non-bonus symbols 310, bonus symbols 350, and a feature symbol 355 at the array position specified by a feature indicator 305. The bonus symbols 350 have respective displayed associated values. The position designated by the feature indicator 305 may be randomly determined and may require an extra wager, fee, or one or more random number selections to become active during the wagering game. The feature symbol 355 displayed at the position specified by the feature indicator 305 is a feature-trigger event. In this embodiment, the feature-trigger event causes the values associated with the displayed bonus symbols 350 to be revealed (if hidden) and immediately awarded. In response, an award amount is tabulated for the initial array 386 and reflected in the meter 375 (as shown) in one embodiment. A determination is then made as to whether a bonus-trigger event has occurred. For example, the display of a threshold number of bonus symbols, such as the six bonus symbols 350 in the initial array 386 may be a bonus-trigger event that causes a bonus feature to be initiated. In this embodiment, no bonus feature would be initiated (triggered) if there were only five bonus symbols 350 displayed in the initial array 386, but an award reflected in the meter 375 is still granted as part of the basic wagering game as a result of the feature-trigger event. Alternatively, the feature-trigger event may impact the initial array 386 in a way that directly or indirectly causes a bonus-trigger event.

Referring now to FIG. 6C, there is illustrated an image of a basic-game screen 382 adapted to be displayed on the primary display 18 or the secondary display 20 during a wagering game in one embodiment. The basic-game screen 382 shows a symbol-based basic-game initial array 387 displaying a combination of non-bonus symbols 310, bonus symbols 350, and a feature symbol 356 at the array position specified by a feature indicator 305. The feature symbol 356 displayed at the position specified by the feature indicator 305 is a feature-trigger event causing an increase in the values associated with each of the bonus symbols 350. In one embodiment, the feature-trigger event causes the associated value for each bonus symbol 350 in the initial array 387 to increase by a specific amount and be immediately awarded to the player. In another embodiment, the initial array 387 becomes part of a larger bonus array (not shown) prior to any award-trigger event resulting in an award to the player (as previously discussed). The associated values for the bonus symbols 350 may increase by a multiple of the total wager amount (e.g., shown in a meter 84), by a predetermined amount, be determined pseudo-randomly, or be determined by various other criteria.

Referring now to FIG. 6D, there is illustrated an image of a basic-game screen 383 adapted to be displayed on the primary display 18 or the secondary display 20 during a wagering game in one embodiment. The basic-game screen 383 shows a symbol-based basic-game initial array 388 displaying a combination of non-bonus symbols 310, bonus symbols 350, and a feature symbol 357 at the array position specified by a feature indicator 305. The feature indicator 305 points to a designated position of the initial array 388 (e.g., a specific reel and associated location) generating a feature-trigger event. In this embodiment, the feature-trigger event replaces two non-bonus symbols 310 in the initial array 388 with additional bonus symbols 352. The additional bonus symbols 352 may contribute to fulfilling criteria for a bonus-trigger event (thereby initiating a bonus feature). In one embodiment, a threshold number of displayed bonus symbols are required for a bonus-trigger event, such as the eight bonus symbols 350, 352, and the symbols of the initial array 388 now meet that criteria. The number and/or the array positions of the additional bonus symbols 352 may be randomly determined, or may be determined by various other criteria. In one embodiment, the additional bonus symbols 352 may also impact an outcome of a bonus feature, e.g., when the additional bonus symbols 352 are carried over into a bonus array of a bonus feature. In other embodiments, the display of the feature symbol 357 occurs during a bonus spin impacting an outcome of the bonus feature.

Referring now to FIGS. 6E-6F, there is illustrated images of a basic-game screen 384 adapted to be displayed on the primary display 18 or the secondary display 20 during a wagering game in one embodiment. The basic-game screen 384 shows a symbol-based basic-game initial array 389 displaying a combination of non-bonus symbols 310, bonus symbols 350, additional bonus symbols 352, and feature symbols 355, 356, 357 at array positions specified by a feature indicators 305, 306, 307. The positions of the initial array 389 designated by the feature indicators 305, 306, 307 may be randomly determined.

In one embodiment, a feature symbol 355, 356, 357 displayed at any of the positions specified by the feature indicators 305, 306, 307 is a feature-trigger event. Any feature-trigger events may also be dependent upon the placement of an additional wager or fee by a player prior to initiation of the wagering game, one or more random number selections, or determined by various other criteria. In this embodiment, three distinct feature-trigger events occur, one for each of the feature symbols 355, 356, 357 respectively consistent with those corresponding above discussed in FIGS. 6B-6D. In one embodiment, the rightmost column is the only portion of the initial array 389 capable of displaying the feature symbols 355, 356, 357 and the sequence of feature-trigger events are processed from top to bottom. The following discussion relates to this embodiment, but the number of available feature symbols 355, 356, 357, feature-trigger events, and order of the processing of the feature-trigger events during evaluation may vary greatly without departing from the scope and spirit of the invention.

In one embodiment, the feature-trigger event processed first relates to the feature symbol 357 replacing two of the non-bonus symbols 310 with additional bonus symbols 352 in the initial array 389. The additional bonus symbols 352 are randomly determined in number and position, having a value as a weighted random value based on the wager amount (e.g., shown in a meter 84). Next, the feature-trigger event related to the feature symbol 356 correspondingly increases the value for the bonus symbols 350 in the initial array 389 by a specific amount. The associated values for the bonus symbols 350 may increase by a multiple of the total wager amount, by a predetermined amount, be determined pseudo-randomly, or be determined by various other criteria. Finally, the feature-trigger event related to feature symbol 355, immediately awards a value associated with each of the bonus symbols 350 in the initial array 389 (e.g., shown in meter 375).

Referring now to FIG. 7, there is illustrated an image of a basic-game screen 480 adapted to be displayed on the primary display 18 or the secondary display 20 during a wagering game in one embodiment. The basic-game screen 480 shows a symbol-based basic-game initial array 485 displaying a combination of non-bonus symbols 410, bonus symbols 450, additional bonus symbols 452, modified bonus symbols 454, and feature symbols 458. The feature symbols 458 may be enhanced bonus symbols that are part of the basic-game reel strips and/or be overlaid symbols that enhance bonus symbols displayed by an underlying reel at one or more positions of the array 485 (e.g., via random placement or overlay reels, not shown). The display of the feature symbols 458 have directional pointers visually indicating specific positions of the initial array 485 where bonus symbols are to be modified or added. In one embodiment, any displayed bonus symbols 450 in impacted positions become modified bonus symbols 454 and any non-bonus symbols 410 remain unchanged. In another embodiment, the feature symbols 458 are a feature-trigger event causing one or more additional bonus symbols 452 to appear in the initial array 485 (in positions not having a displayed bonus symbol 450) and/or creating modified bonus symbols 454 (in positions already having a displayed bonus symbol 450) by adding the value associated with the feature symbol 458 to the bonus symbol 450.

The values associated with the feature symbols 458 may be a multiple of a total wager amount, may be a predetermined credit amount, may be determined pseudo-randomly, or may be determined by various other criteria. In one embodiment, a bonus-trigger event occurs in response to the display of a threshold number of bonus symbols, such as the eight bonus symbols including bonus symbols 450, additional bonus symbols 452, and modified bonus symbols 454 in the initial array 485 (initiating a bonus feature) where a bonus-trigger event would not have occurred without the display of feature symbols 458 and resulting feature-trigger events.

Referring now to FIG. 8, there is illustrated an image of a basic-game screen 580 adapted to be displayed on the primary display 18 or the secondary display 20 during a wagering game in one embodiment. The basic-game screen 580 shows a basic-game symbol array 581 comprising a symbol-based basic-game initial array 585 and a symbol-based secondary array 587. The secondary array 587 displays a set of symbols (including bonus symbols 552) scattered in various array positions above the columns of the initial array 585. The initial array 585 comprises a combination of non-bonus symbols, bonus symbols 550, and feature symbols 559. The display of a feature symbol 559 in the initial array is a feature-trigger event causing a corresponding reel column of the initial array 585 to extend a random number of array positions into the secondary array 587 (effectively expanding the column of the initial array 585). The feature symbol 559 in the leftmost column of the initial array 585 extends the leftmost column an additional two array positions into the secondary array 587, and the feature symbol 559 in the fourth column of the initial array 585 extends the fourth column an additional three positions into the secondary array 587. In another embodiment, a feature symbol 559 causes the number of array positions in a particular column to extend a fixed and consistent amount. The number of positions that a column expands may be related to a total wager amount, be randomly determined, pseudo-randomly determined, or predetermined, be determined by various other criteria, or any combination of these.

As the columns of the initial array 585 extend, one or more additional bonus symbols 555 that are captured by the extended columns may contribute to criteria for a bonus-trigger event. In one embodiment, criteria for a bonus-trigger event is met in response to the display of a threshold number of bonus symbols, such as the display of six bonus symbols 550, 555 in the initial array 585. Prior to the extension of the two columns of the initial array 585, the display of the bonus symbols 550 solely in the initial array 585 fail to meet the criteria for the bonus-trigger event, but the extension of the columns of the initial array 585 now encompass a total of seven bonus symbols 550, 555 meeting the required criteria for the bonus-trigger event. In one embodiment, the bonus-trigger event causes initiation of a bonus feature with at least one bonus symbol carried over to a bonus array (not shown). In an embodiment, once the bonus feature is triggered, the initial array plus the extended columns (if any) becomes the bonus array and all vacant symbol positions in the bonus array spin during bonus spins.

In another embodiment, a feature symbol 559 displayed in a bonus array may extend one or more columns of the bonus array (e.g., the column the feature symbol 559 is in, a randomly determined column, in a random direction, etc.). Additional bonus symbols captured by the extended columns may increase the number of bonus symbols eligible for winning and may increase a resulting award awarded in response to an award-trigger event (e.g., depletion of all remaining bonus spins, filling in all the positions of a row, meeting a predetermined threshold, etc.).

Referring now to FIGS. 9A-9B, another embodiment is illustrated having an image of a bonus-feature screen 690 adapted to be displayed on the primary display 18 or the secondary display 20. The screen 690 shows a symbol-bearing bonus array 695 displaying symbols at various positions and a row of column headers 625. Each of the column headers 625 specifies a value for a corresponding progressive jackpot award. The progressive jackpot awards may be available to win in response to an award-trigger event based on the symbols of the bonus array 695.

During the most recent bonus spin (following decrementing the bonus spin meter 630), a set of additional bonus symbols 652 are displayed in the bonus array 695, as shown. In one embodiment, the filling of all positions of any column of the bonus array 695 with bonus symbols is an award-trigger event. In this case, an award is determined for the player according to the values associated with the corresponding progressive jackpot and the bonus symbols in the column 691. That is, an award is determined based on a combination of the current progressive jackpot for the column 691 (because all the positions of the column 691 are filled with bonus symbols) and a value associated with the bonus symbols 650, 652 in the column 691 (as reflected in the meter 640). In one embodiment, the progressive jackpot award for column 691 is reset to a predetermined value after being awarded. The reset progressive jackpot award is reflected in the column header 625 for column 691 in FIG. 9B. In one embodiment, the bonus symbols 650, 652 in column 691 are removed from the bonus array 695 in response to the award-trigger event. In this embodiment, the display of an additional bonus symbol 652 is also a reset event that increments the number of bonus spins shown in the meter 630. As detailed prior, the bonus feature continues until all the bonus spins are depleted.

Alternatively, the screen 690 may be displayed as part of a basic-game portion of a wagering game, causing an award-trigger event in response to a filled column (or row) with bonus symbols. The specifics of this embodiment (and all the other embodiments described herein) are not limited specifically to a basic-game feature or a bonus feature of a wagering game and may be used in a variety of ways while remaining in the scope and spirit of the invention.

Referring now to FIG. 10A, another embodiment is illustrated having an image of a bonus-feature screen 690 adapted to be displayed on the primary display 18 or the secondary display 20. The screen 690 shows a symbol-bearing bonus array 695 displaying symbols at various positions that are randomly determined using a set of bonus reel strips as detailed prior. Among the displayed symbols in the bonus array 695 are bonus symbols 650 and a set of feature symbols 656, 657, 658. Each of the feature symbols 656, 657, 658 specifies a value multiplier that increases the value associated with a randomly determined displayed bonus symbol 650 in the bonus array 695 in one embodiment. In another embodiment, a feature symbol 656-658 may impact more than a single bonus symbol 650. In one embodiment, a feature symbol 656, 657, 658 may also increase the value associated with a progressive jackpot, in addition to multiplying values associated with a bonus symbol 650 that has been previously increased.

Referring now to FIG. 10B, the effects of the feature symbols 656, 657, 658 can be observed in the resulting bonus array 695. The feature symbols 656, 657, 658 have increased the values associated with a set of corresponding bonus symbols 650 (indicated by arrows) to generate modified bonus symbols 654 having increased associated values. In response to an award-trigger event, the values associated with one or more of the bonus symbols 650, 654 in the bonus array 695 are awarded to a player of the wagering game. While the modified bonus symbols 654 are in the same row as the feature symbol 656-658 causing the increase in this embodiment, this is not required in other embodiments. A feature symbol 656-658 may increase the associated value for any bonus symbol 650 in the bonus array 695 (whether predetermined or randomly determined) without departing in scope or spirit of the invention.

Referring now to FIG. 11A, another embodiment is illustrated having an image of a bonus-feature screen 790 adapted to be displayed on the primary display 18 or the secondary display 20. The screen 790 shows a symbol-bearing bonus array 795 displaying symbols at various positions that are randomly determined based on a set of bonus reel strips as detailed prior. Among the displayed symbols in the bonus array 795 are bonus symbols 750 that may include one or more bonus symbols 757 that are associated with a value of a progressive award. The bonus array 795 also includes an additional multiplier reel 796 using bonus reel strips containing multiplier symbols 759. In response to displaying a multiplier symbol 759, all the bonus symbols 750 in the same row have their associated value increased an amount corresponding to the multiplier symbol 759 (including progressives) prior to the removal of the multiplier symbols 759 in one embodiment. In other embodiments, a multiplier symbol 759 may randomly determine one or more bonus symbols 750 to modify.

Referring now to FIG. 11B, the bonus screen 790 is shown illustrating the effect of the multiplier symbols 759 (shown in FIG. 11A) and the resulting feature-trigger event. The bonus symbols 754 have been modified by the multiplier symbols 759 and bonus symbols 750 (that are positioned in rows that do not correspond with the multiplier symbols 759) are not modified in this embodiment. In response to an award-trigger event (e.g., depletion of all the bonus spins), the values associated with one or more of the bonus symbols 750, 754 in the bonus array 795 are awarded to a player of the wagering game.

Figure 12:
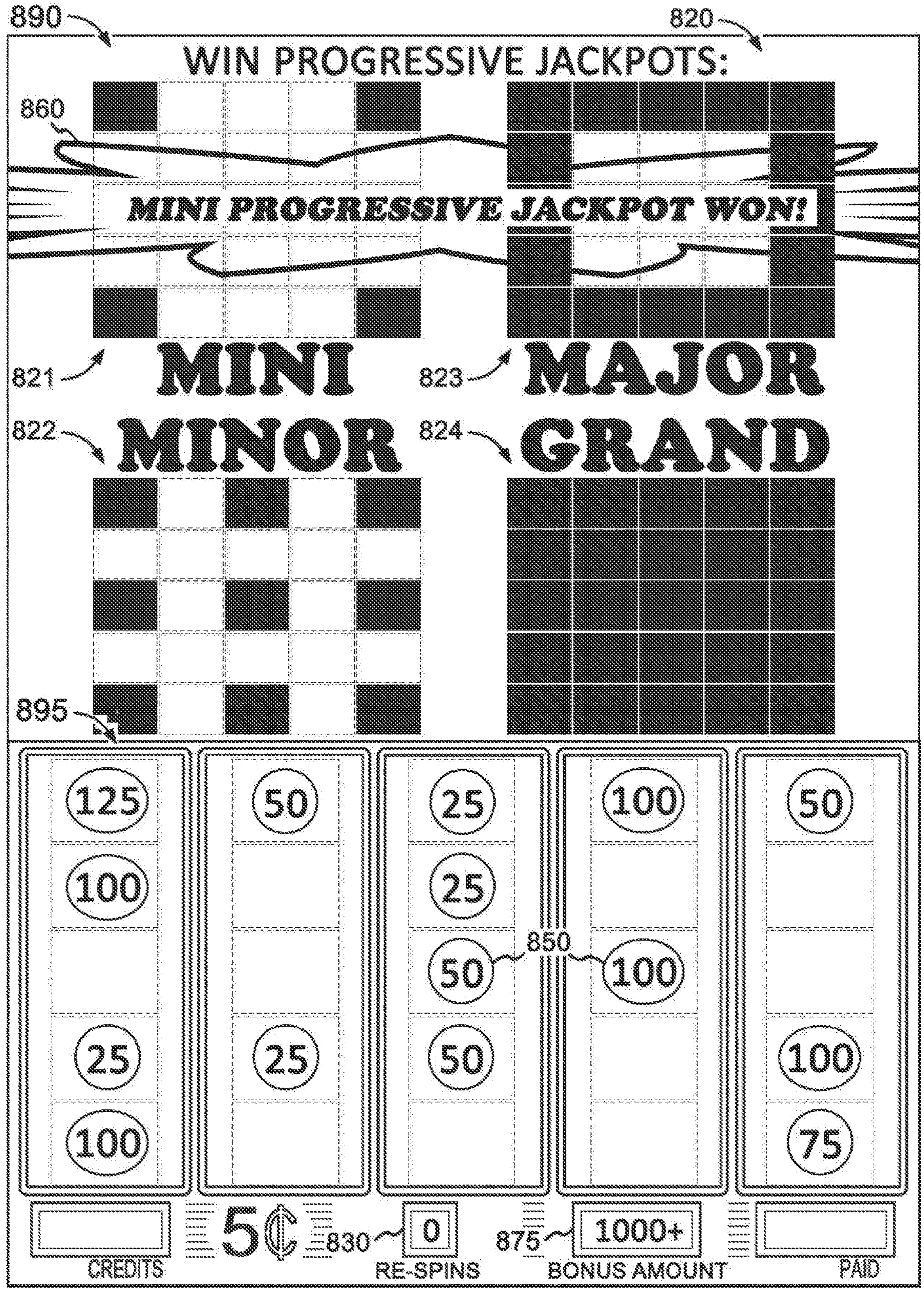
FIG. 12 is an image of an exemplary bonus-feature screen of a wagering game displayed on a gaming machine using patterns for symbol collection for progressive jackpots, according to an embodiment of the present invention.

Referring now to FIG. 12, another embodiment is shown having an image of a bonus-feature screen 890 adapted to be displayed on the primary display 18 or the secondary display 20 in one embodiment. The screen 890 displays a bonus feature having a set of progressive jackpot awards available to win in response to a progressive award-trigger event. The screen 890 shows a displayed set of progressive jackpot awards in a display field 820 and a symbol-based bonus array 895 displaying bonus symbols 850.

The display field 820 reflects a set of symbol patterns 821-824, each corresponding to a set of positions of the bonus array 895. The symbol patterns 821-824 display criteria for the displayed bonus symbols 850 required to cause a progressive award-trigger event (thereby awarding a progressive jackpot). That is, a player becomes eligible to win a progressive jackpot depending upon the positions of the bonus symbols 850 in the bonus array 895 in one embodiment. As bonus symbols 850 fill the positions of the bonus array 895, a progressive award-trigger event occurs in response to a set of bonus symbols 850 in positions matching one or more of the symbol patterns 821-824. The highest eligible progressive jackpot is awarded to a player when the bonus symbols 850 meet the criteria of at least one symbol pattern 821-824. Other embodiments may use various other criteria (e.g., additional or different symbol patterns) for causing progressive award-trigger events.

In the current embodiment, the depletion of the bonus spins (as reflected in the spin counter 830) is an award-trigger event causing a tabulation of the values associated with the bonus symbols 850 of the bonus array 895, wherein the total is reflected in the meter 875. Additionally, a progressive award-trigger event occurs as a set of bonus symbols 850 positions are determined to match the symbol pattern 821. The progressive award-trigger event results in awarding the MINI progressive jackpot to the player (indicated by the notification 860 on the screen 890).

Alternatively, in another embodiment, each of the symbol patterns 821-824 causes an award-trigger event and corresponding award not associated with a progressive jackpot. In one embodiment, the bonus symbols 850 matching a specific symbol pattern 821-284 may result in one or more bonuses rather than a progressive jackpot. For example, the symbol patterns 821-824 may alternatively correspond to five free bonus base-games, ten free bonus base-games, twenty-five free bonus base-games, and 250 free bonus base-games. Any type of award may be awarded to a player in response to an award-trigger event without departing from the overall scope and spirit of the invention.

Figure 13:
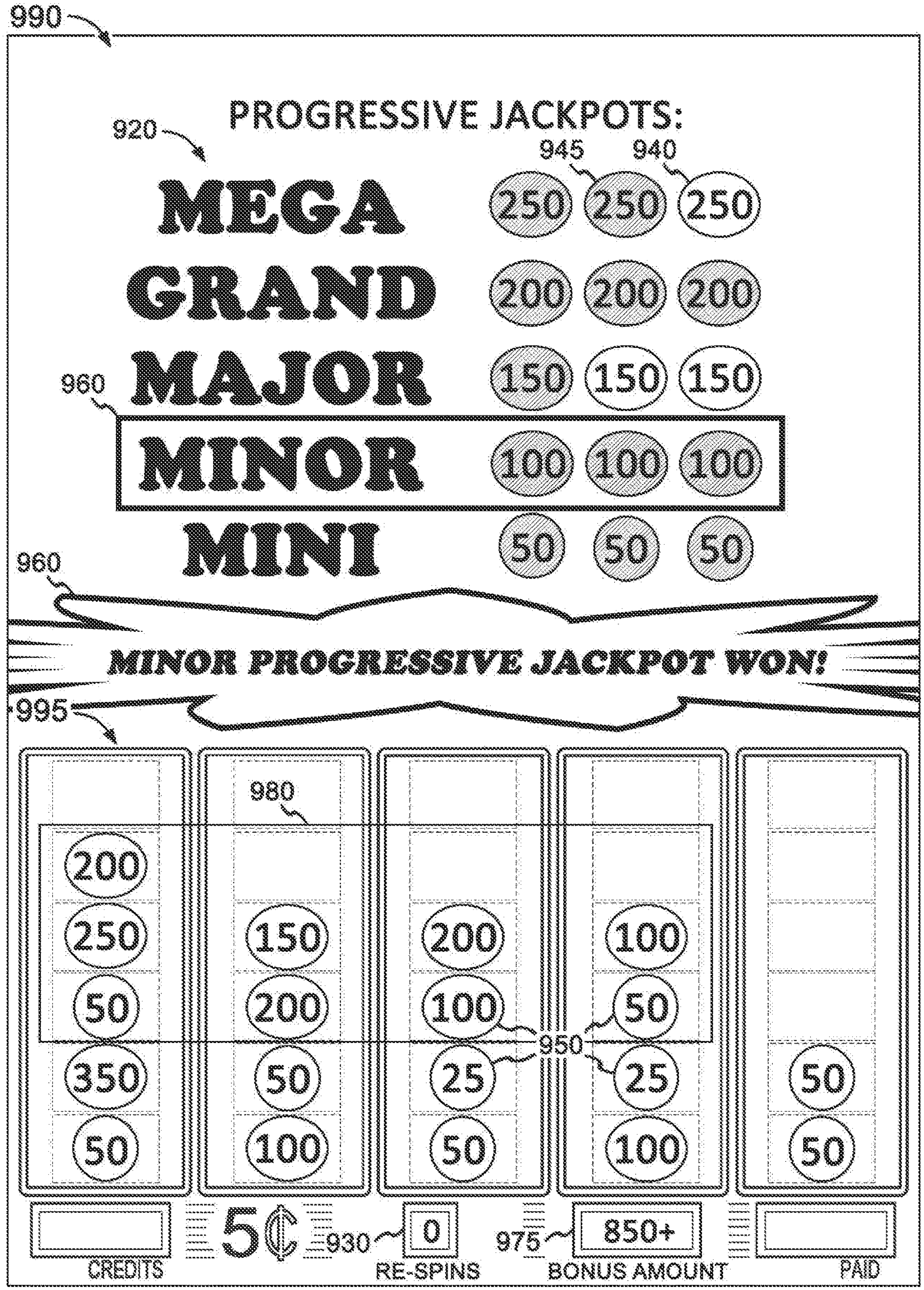
FIG. 13 is an image of an exemplary bonus-feature screen of a wagering game displayed on a gaming machine using symbol collection for progressive jackpots, according to an embodiment of the present invention.

Referring now to FIG. 13, another embodiment is shown having an image of a bonus-feature screen 990 adapted to be displayed on the primary display 18 or the secondary display 20 in one embodiment. The screen 990 displays a bonus feature having a set of progressive jackpot awards available to win in response to a progressive award-trigger event. The screen 990 shows a displayed set of progressive jackpot awards in a display field 920 and a symbol-based bonus array 995 displaying bonus symbols 950. The completion of this particular bonus feature may be deduced by the depleted spin counter 930. In this embodiment (similar to FIGS. 4G-4H), the bonus symbols 950 filling an entire row of the bonus array 995 meet criteria for an award-trigger event, while the remainder of the bonus symbols 950 (within the region 980) do not contribute to an award. In response to the award-trigger event, the values associated with the bonus symbols 950 in the filled rows are tabulated to determine a corresponding award (reflected in the meter 975).

Additional to the award-trigger event as a result of the filled rows, a player may be eligible to win one or more progressive jackpots depending upon the bonus symbols 950 of the bonus array 895. In one embodiment, the criteria for winning a progressive jackpot award may be met by displaying a specific set of bonus symbols 950. In one embodiment, a progressive award-trigger event awards a player the highest eligible progressive jackpot award having shaded markers 945 for itself and all lower jackpots. As bonus symbols 950 are displayed in the bonus array 995, an unshaded marker 940 corresponding to an associated value for the bonus symbol 950 becomes a shaded marker 945. The outcome of the bonus array 995 allows a player to collect a plurality of bonus symbols 950 and shaded markers 945 that may ultimately cause a progressive award-trigger event. As an example, in response to displaying a bonus symbol 950 having an associated value of 200, an unshaded marker 940 for the GRAND jackpot award becomes a shaded marker 945 (until all of the set of GRAND markers are shaded). In one embodiment, when no unshaded makers 940 remain for a particular progressive award, no additional markers become shaded markers 945.

In one embodiment, a progressive award-trigger event occurs when the bonus spins are depleted and criteria is met for awarding a progressive jackpot. The progressive award-trigger event awards the highest eligible progressive jackpot having all lower shaded markers 945 (in this case, the MINOR jackpot). In the embodiment of FIG. 13, no progressive award-trigger event results from all the GRAND jackpot markers being shaded because at least one of the MAJOR jackpot markers remains unshaded. Thus, the player is ineligible to win the MAJOR, GRAND, or MEGA progressive jackpots. The progressive award-trigger event and resulting award may be indicated by one or more notifications 960 on the screen 990.

Figure 14:
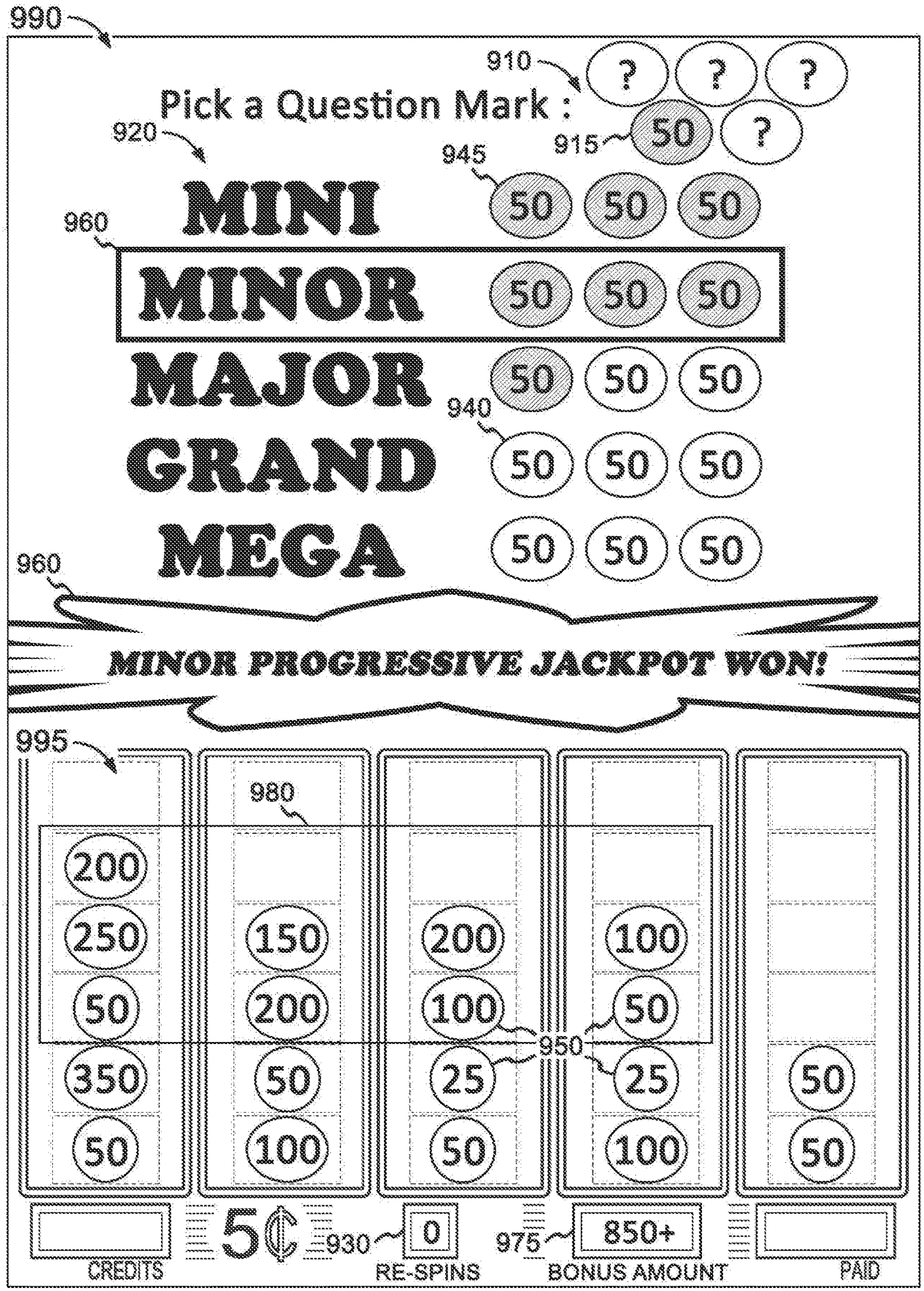
FIG. 14 is an image of an exemplary bonus-feature screen of a wagering game displayed on a gaming machine using a combination of player-picked indicia and symbol collection for progressive jackpots, according to an embodiment of the present invention.

Referring now to FIG. 14, another embodiment is shown having an image of a bonus-feature screen 990 adapted to be displayed on the primary display 18 or the secondary display 20 in one embodiment. Similar to FIG. 13, the screen 990 shows a displayed set of available progressive jackpot awards in a display field 920 and a symbol-bearing bonus array 995 displaying bonus symbols 950. The bonus symbols 950 displayed filling an entire row of the bonus array 995 meet criteria for an award-trigger event, while the bonus symbols 950 within the region 980 do not contribute to an award because no corresponding complete row of bonus symbols 950 has been achieved.

In one embodiment, prior to conducting any bonus spins a player is given an option to choose one of a plurality of indicia in a pick field 910. The player-selected indicia 915 is revealed, being one of the available bonus symbols having a particular associated value. During the bonus feature, the bonus symbols 950 are revealed in the bonus array 995 during bonus spins (discussed prior). Each bonus symbol 950 matching the player-selected indicia 915 sequentially converts a progressive award unshaded marker 940 to a shaded marker 945. The shaded markers 945 are displayed beginning at the lowest progressive jackpot and advance to higher progressive jackpots as each level of progressive jackpot award is completed. A progressive award-trigger event occurs when the bonus spins are depleted and the bonus feature concludes (e.g., deduced from the meter 730) wherein the highest eligible progressive jackpot having all lower shaded markers 945 is awarded. In this case, the player is awarded the MINOR jackpot. No progressive award-trigger event occurs corresponding to the MAJOR jackpot because unshaded markers 940 remain for winning this progressive jackpot. The progressive award-trigger event and progressive jackpot award is indicated by the notifications 960 on the screen 990.

Referring now to FIGS. 15A-15B, there is illustrated an image of a feature game screen 1090 adapted to be displayed on the primary display 18 or the secondary display 20 in one embodiment. The screen 1090 shows a symbol-bearing array 1095 for displaying symbols at various positions. In one embodiment, a player is given an opportunity to select a number of specific positions of the array 1095 prior to any symbols being displayed in the array 1095 during (bonus) spins. Alternatively, a bonus-within-a-bonus feature may trigger a picking bonus feature during a bonus feature. In response to input from the player (via one or more input devices), the array positions corresponding to the player selections 1015 may become highlighted. Alternatively, random positions of the array 1095 may be chosen on behalf of the player. When selections are completed, spins are performed and bonus symbols are generated and displayed in one or more ways as previously described in this specification. The bonus symbols 1050 may be displayed in any position of the array 1095, including array positions corresponding to the player selections 1015. In one embodiment, when the bonus symbols 1050 fill in all of the positions corresponding to the player selections 1015, criteria is met for an additional award-trigger event. Examples of additional award-trigger events may include one or more of awarding a progressive jackpot (e.g., starting at the lowest progressive and advancing), awarding a multiplier to a determined bonus award, performing an additional bonus feature, awarding additional credits or awards, increasing the value associated with one or more of the bonus symbols 1050 (e.g., by multiplier or a random or fixed value of bonus symbols in the selected positions, randomly determined bonus symbols, etc.), restarting the bonus feature with modified bonus symbols or a progressive jackpot having an increased award value, conducting one or more additional bonus features (e.g., adding additional bonus symbols, increasing bonus symbol(s) values, etc.), etc.

The screen 1090 may be used during a basic-game portion or a bonus-feature portion of a wagering game, either employed during a basic-game feature (e.g., generating a bonus-trigger event in response to a predetermined number of player selections 1015 containing bonus symbols 1050), during a bonus feature (e.g., generating an award-trigger event in response to a predetermined number of player selections 1015 matched with bonus symbols 1050), or both. The specifics of this embodiment (and all the other embodiments described herein) are not limited specifically to a basic-game feature or a bonus feature of a wagering game and may be used in a variety of ways while remaining in the scope and spirit of the invention.

Figure 16A:
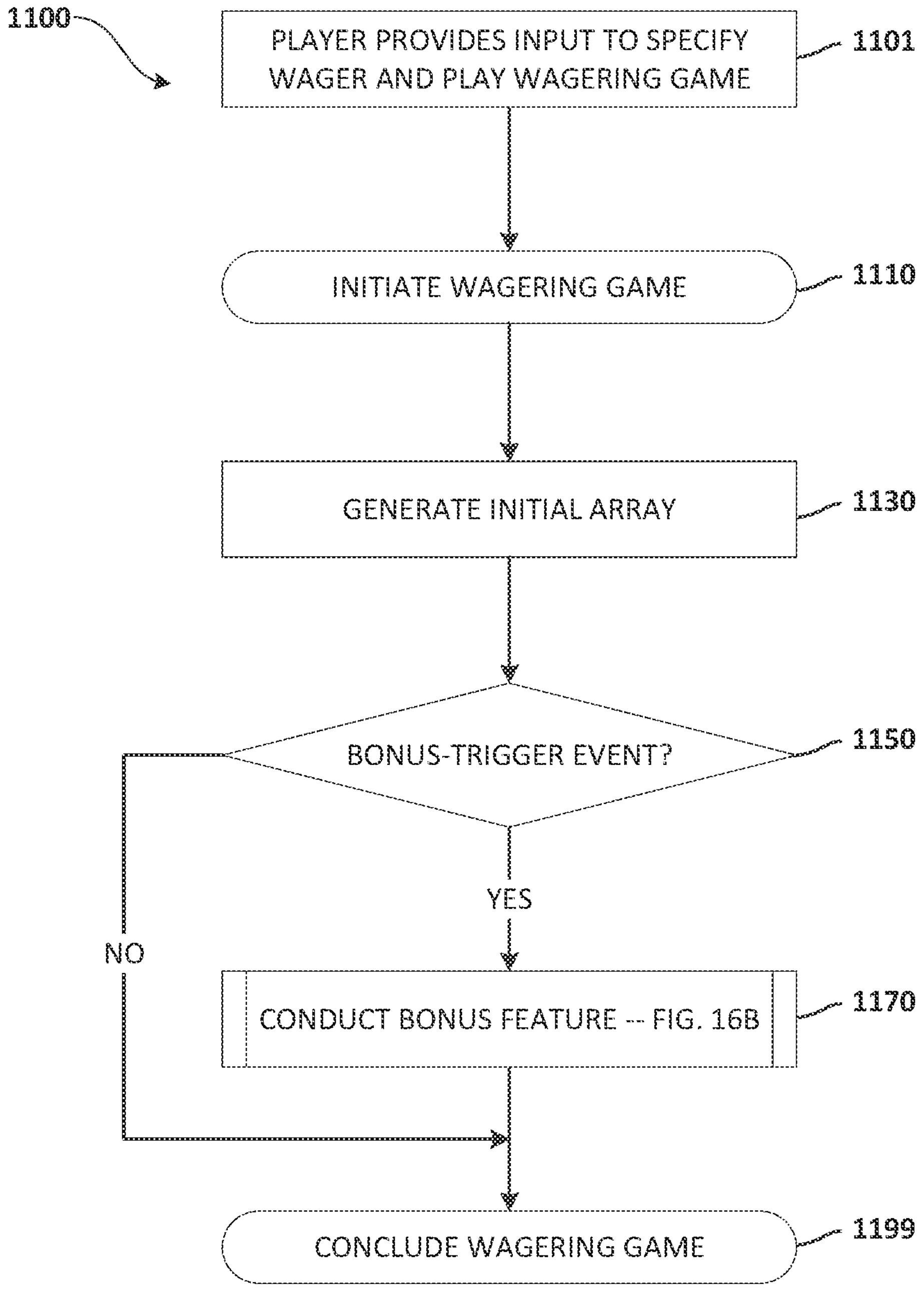
FIGS. 16A-16B are flowcharts for an algorithm that corresponds to instructions executed by a controller in accord with at least some aspects of the disclosed concepts.

Referring now to FIG. 16A, a flowchart, described by way of example above, represents one data processing method 1100 corresponding to at least some instructions stored and executed by the game-logic circuitry 40 in FIG. 2 to perform the above described functions associated with the disclosed concepts. The method 1100 further incorporates a data processing method 1200 detailed in FIG. 16B that describes one way a bonus feature may be conducted during the operation of the wagering game in response to a bonus-trigger event.

In step 1101, the game-logic circuitry 40 receives player input via one or more input devices that indicates a wager amount drawn on a credit balance and an intention to initiate an instance of the wagering game. Examples of input include pressing a "MAX BET" or "SPIN REELS" button on a wagering machine, or interfacing with the wagering game system in another way, e.g., using a mobile device or hand gesture to control the wagering machine.

In step 1110, in response to the input provided by the player and interpreted by the wagering game machine and system, the wagering game is initiated as the formal process for conducting the wagering game is started. In one embodiment, credits are deducted from a credit meter to fund the gaming instance in accordance with the player input indicating a wager drawn on a credit balance associated with the player.

In step 1130, the basic-game initial array is initialized and symbols are randomly determined using a set of basic-game reels to generate a corresponding basic-game initial array outcome. That is, one or more electronic display devices are directed to display symbols representing at least a part of an outcome of the wagering game in the initial array. As discussed prior, the initial array may comprise any type of configuration, reels composition, and associated criteria for bonus-trigger events, feature-trigger events, and award-trigger events. The specifics of the basic-game and initial array may be greatly varied between embodiments.

In step 1150, a determination as to whether a bonus-trigger event is included in the initial array outcome. In one embodiment, a set of bonus symbols having respective, associated values displayed in the initial array is a bonus-trigger event initiating a bonus feature. In other embodiments, the bonus-trigger event is a mystery trigger.

In step 1170, in response to a bonus-trigger event, a bonus feature is performed. This may include any of the prior described embodiments, among others. In one embodiment, the bonus feature is initiated on a bonus array of symbol-bearing bonus reels that include bonus symbols having respective, associated values. One specific embodiment for conducting a bonus feature is described in detail in FIG. 16B below. During the bonus feature, an award-trigger event may occur resulting in a corresponding amount awarded to the player. Award-trigger events may result in awarding a credit value in one or more currencies, free wagering game instances, progressive jackpot awards, non-credit related prizes, etc.

In step 1199, after the bonus feature is completed (or in the event that no bonus-trigger event was present in the initial array) the wagering game instance is formally concluded.

Figure 16B:
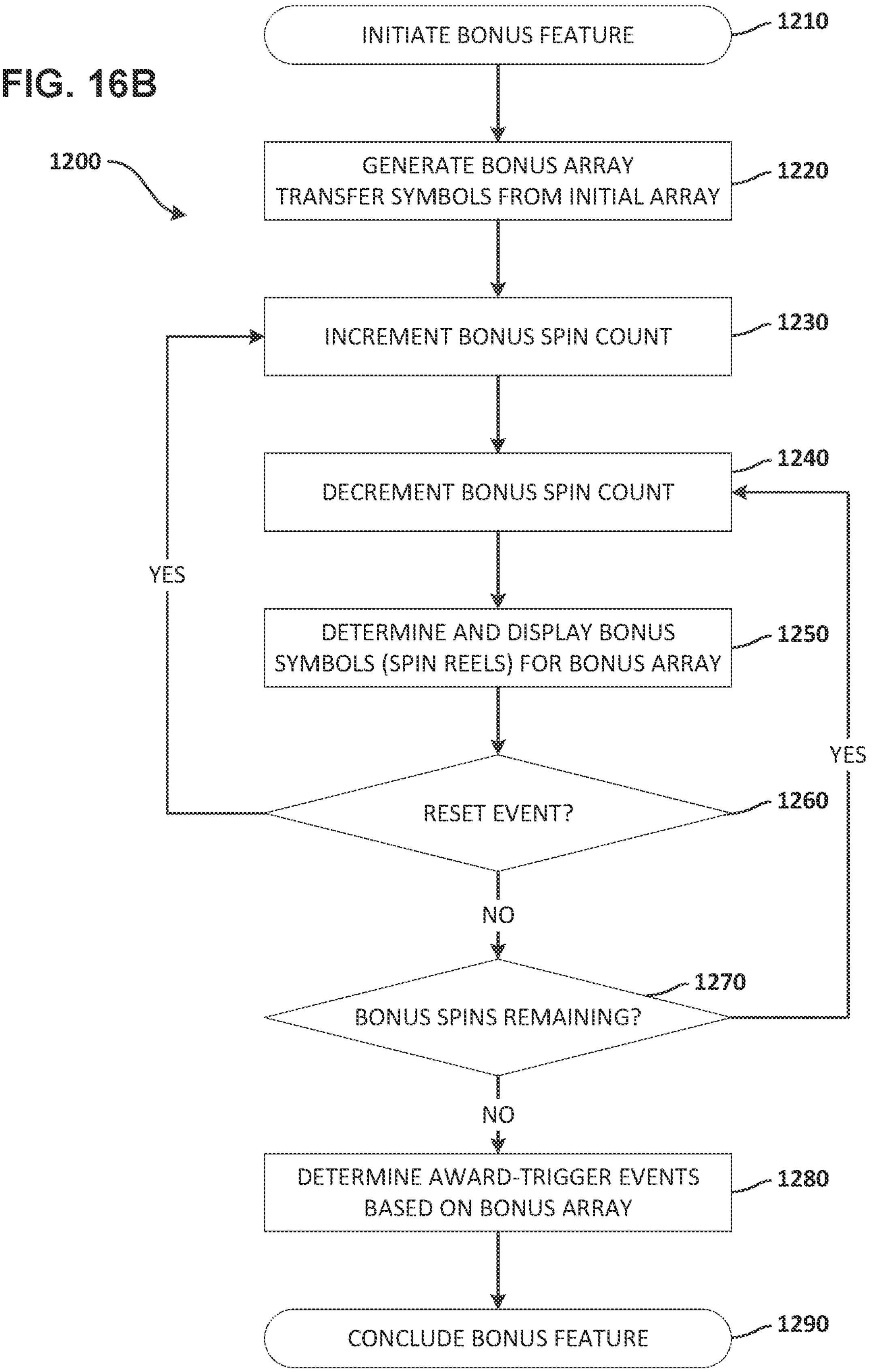

Referring now to FIG. 16B, one embodiment for a data processing method 1200 is represented corresponding to at least some instructions stored and executed by the game-logic circuitry 40 in FIG. 2 to perform the above described functions. The data processing method 1200 describes performing a bonus feature conducted during the operation of the wagering game described in FIG. 16A in one embodiment.

In step 1210, the bonus feature is initiated in response to a bonus-trigger event in the initial array, in one embodiment. As detailed prior, the bonus feature may be initiated by a bonus-trigger event that includes one or more bonus symbols displayed as part of a basic-game initial array outcome or as a result of a mystery trigger (e.g., RNG selection).

In step 1220, a bonus array is generated for the bonus feature. In one embodiment, the bonus array comprises a set of array positions where a set of symbol-bearing bonus reels are used in conjunction with one or more random numbers to conduct a plurality of bonus spins and visually display symbols in the array positions. The bonus array may be formed by an expansion of array positions of the initial array, e.g., by the addition of rows and/or columns, or expansion of one or more existing rows or columns of the initial array, as discussed prior. A bonus array having different dimensions or different configurations of array positions is also within the scope and spirit of the invention.

In one embodiment, the bonus symbols in the initial array are carried over to the bonus array. As the dimensions and layout of the bonus array positions may be significantly different than the initial array, the positioning of the bonus symbols relative to one another may change as the bonus array is presented. After transferred bonus symbols are carried over and positioned in the bonus array, the positioning of one or more bonus symbols in the bonus array may also change, e.g., as detailed prior where a bonus symbol displayed in a column of the bonus array drops to the lowest available unoccupied position of the column.

In step 1230, a number of bonus spins in a spin counter is set for the bonus feature. In one embodiment, a spin counter (e.g., spin counter 132) displayed on the graphical user interface is incremented. The number of bonus spins may be incremented by a random, pseudo-random, or predetermined amount, or increment the plurality of bonus spins to a particular value. In the event that the number of bonus spins being incremented is in response to a reset event, the number of bonus spins may be different from an initial value of incremented bonus spins.

In step 1240, the number of bonus spins in the spin counter is decremented prior to initiating and conducting a bonus spin. In one embodiment, a spin counter (e.g., spin counter 132) displayed on the graphical user interface is decremented.

In step 1250, a bonus spin is conducted by spinning and stopping the bonus reels to populate the bonus array with symbols. In one embodiment, the symbols displayed at the positions of the bonus array are determined using one or more random numbers in conjunction with the bonus reels to generate a set of symbols displayed in the array (including bonus symbols). During the bonus spin process, the symbols for positions of the bonus array displayed to generate a corresponding bonus array outcome. In one embodiment, each bonus spin results in each position of the bonus array displaying a bonus symbol or a non-bonus symbol. One or more feature-trigger events may also occur during a bonus spin as detailed prior, altering the bonus array outcome.

In step 1260, a determination is made as to whether the bonus array contains a reset event. A reset event increments the number of bonus spins in the spin counter. A reset event may be a result of a predetermined reset symbol combination displayed in the bonus array during the latest bonus spin (e.g., a specific or new configuration of bonus symbols). In one embodiment, the addition and display of a new configuration of bonus symbols in the bonus array is a reset event, such that the spin counter is incremented (reset) to a predetermined value in response to the reset event. In another embodiment, the reset event is the display of a dedicated special bonus spin symbol on one or more bonus reels that either increments the spin counter to a particular value or increments the spin counter a predetermined amount. A reset event may also include a randomly generated trigger, e.g., a mystery trigger based upon the outcome of a RNG or some other mechanism. In one embodiment, when a reset event occurs, the process returns to step 1230 where a particular number of bonus spins is incremented to the spin counter for the bonus feature (such that additional bonus spins occur). As noted above, the number of bonus spins in the spin counter may have any predetermined, random, or pseudo-random value, dependent upon embodiment. Following a reset event, the spin counter is decremented after each additional bonus spin, and bonus spins are repeatedly performed until the bonus feature concludes in response to depletion of the spin counter.

In step 1270, in response to no reset event in the outcome, a determination is made as to whether there are remaining bonus spins in the spin counter. If so, the process returns to step 1240 where the spin counter is decremented and another bonus spin is conducted. In the event that no bonus spins remain (i.e., the bonus spin counter is depleted), the bonus array displays an outcome.

In step 1280, an award is determined for the outcome if specific predetermined criteria are met (i.e., in response to an award-trigger event). As detailed prior, the bonus array and corresponding outcome may be evaluated according to one or more criterion for determining awards including bonus symbols arranged in defined pay lines, values associated with bonus symbols, values associated for sets of bonus symbols, bonus symbols arranged a predefined configuration or located in specific positions of the bonus array, fulfilling predetermined conditions (e.g., one or more completed sets of identical/differing bonus symbols), specific sets of bonus symbols in filled rows or columns, a collective associated value for many bonus symbols (wherein individual bonus symbols have no associated value when isolated), etc. In some embodiments, an award is tabulated for the bonus array using values associated with only a subset of the bonus symbols of the array (e.g., less than all of the bonus symbols displayed in the bonus array). The values of particular bonus symbols may also be altered by additional (random) trigger events that impact the determined bonus outcome award. Ultimately, any and all predefined criteria may be used to define award-trigger events and derive a corresponding award amount for the bonus array in a predictable way that is awarded to a player.

In step 1290, the bonus feature concludes. The process flow returns to the parent wagering game process that called the bonus feature so that the wagering game can continue or formally conclude. In one embodiment, the bonus feature is followed by an additional bonus feature triggered by an additional bonus-trigger event in the initial array outcome. In other embodiments, the bonus feature and determined outcome award impacts a determined award of the initial array outcome.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A method of operating a gaming machine, the method comprising the operations of:

accepting, via at least one electronic input device an input indicative of a wager to initiate a wagering game;

displaying, on an electronic display device, an array of symbol positions comprising rows and columns, and displaying a bonus display field comprising a plurality of symbol patterns, each symbol pattern corresponding to a set of positions in the array of symbol positions and associated with a respective award, wherein the respective award associated with at least one symbol pattern is one of a plurality of jackpot awards including at least a major jackpot award and a minor jackpot award;

animating a spin of symbol-bearing reels wherein the symbol-bearing reels are spun and stopped to land a plurality of bonus symbols borne by the reels in the array according to one or more outputs of a continuously cycling random number generator, the plurality of bonus symbols each bearing a respective one of a plurality of values; and in response to a matching event comprising a set of positions in the array being completely filled by the landed bonus symbols in a pattern matching at least one of the plurality of symbol patterns displayed in the bonus display field, awarding, by game logic circuitry, an award associated with the at least one matched symbol pattern, wherein the awarded award corresponds to the respective jackpot award associated with the at least one matched symbol pattern displayed in the bonus display field.

2. The method of claim 1, wherein the award associated with each of the plurality of symbol patterns comprises a value for a corresponding progressive jackpot award.

3. The method of claim 1, wherein the award associated with each of the plurality of symbol patterns comprises a value for a corresponding number of free bonus base games.

4. The method of claim 1, wherein the spin is one of a plurality of spins that do not require respective wagers and are performed in response to a trigger event in a base wagering game.

5. The method of claim 4, further including displaying, on the electronic display device, a spin counter showing a number of the plurality of spins remaining.

6. The method of claim 5, further comprising, in response to the number of the plurality of spins remaining reaching zero, awarding, by game-logic circuitry, a separate award based on the values borne by the bonus symbols in the array.

7. The method of claim 1, wherein the electronic display device comprises a primary display.

8. The method of claim 1, wherein the electronic display device comprises a secondary display.

9. The method of claim 1, wherein at least one of the plurality of patterns comprises the upper left, lower left, upper right and lower right positions in the array of symbol positions.

10. The method of claim 1, wherein at least one of the plurality of patterns comprises the center position in the array of symbol positions.

11. A gaming system, comprising:

at least one electronic input device configured to accept an input indicative of a wager to initiate a wagering game;

an electronic display device configured to display an array of symbol positions comprising rows and columns, and to display a bonus display field comprising a plurality of symbol patterns, each symbol pattern corresponding to a set of positions in the array of symbol positions and associated with a respective award, wherein the respective award associated with at least one symbol pattern is one of a plurality of jackpot awards including at least a major jackpot award and a minor jackpot award; and game-logic circuitry configured to perform the operations of;

animating a spin of symbol-bearing reels wherein the symbol-bearing reels are spun and stopped to land a plurality of bonus symbols borne by the reels in the array according to one or more outputs of a continuously cycling random number generator, the plurality of bonus symbols each bearing a respective one of a plurality of values; and in response to a matching event comprising a set of positions in the array being completely filled by the landed bonus symbols in a pattern matching at least one of the plurality of symbol patterns displayed in the bonus display field, awarding an award associated with the at least one matched symbol pattern, wherein the awarded award corresponds to the respective jackpot award associated with the at least one matched symbol pattern displayed in the bonus display field.

12. The gaming system of claim 11, wherein the award associated with each of the plurality of symbol patterns comprises a value for a corresponding progressive jackpot award.

13. The gaming system of claim 11, wherein the award associated with each of the plurality of symbol patterns comprises a value for a corresponding number of free bonus base games.

14. The gaming system of claim 11, wherein the spin is one of a plurality of spins that do not require respective wagers and are performed in response to a trigger event in a base wagering game.

15. The gaming system of claim 14, wherein the game-logic circuitry is further configured to, on the electronic display device, display a spin counter showing a number of the plurality of spins remaining.

16. The gaming system of claim 15, wherein the game-logic circuitry is further configured to, in response to the number of the plurality of spins remaining reaching zero, award a separate award based on the values borne by the bonus symbols in the array.

17. The gaming system of claim 11, wherein the electronic display device comprises a primary display.

18. The gaming system of claim 11, wherein the electronic display device comprises a secondary display.

19. The gaming system of claim 11, wherein at least one of the plurality of symbol patterns comprises the upper left, lower left, upper right and lower right positions in the array of symbol positions.

20. The gaming system of claim 11, wherein at least one of the plurality of symbol patterns comprises the center position in the array of symbol positions.

* * * * *